(12) United States Patent
Itoyama et al.

(10) Patent No.: US 6,412,469 B1
(45) Date of Patent: Jul. 2, 2002

(54) FUEL INJECTION CONTROL SYSTEM FOR DIESEL ENGINE

(75) Inventors: Hiroyuki Itoyama, Yokohama; Kensuke Osamura, Kanagawa; Takashi Shirakawa, Kanagawa; Manabu Miura, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/620,973

(22) Filed: Jul. 20, 2000

(30) Foreign Application Priority Data

Jul. 21, 1999 (JP) .......................................... 11-205950

(51) Int. Cl.[7] ............................. F02D 41/04; F02B 17/00
(52) U.S. Cl. ....................... 123/299; 701/104; 123/490
(58) Field of Search ............................... 123/299, 300, 123/490; 701/103, 104, 105

(56) References Cited

U.S. PATENT DOCUMENTS

| | | | | |
|---|---|---|---|---|
| 5,402,760 A | * | 4/1995 | Takeuchi et al. | 123/490 |
| 5,647,317 A | * | 7/1997 | Weisman, II et al. | 123/299 |
| 5,713,328 A | * | 2/1998 | Anderson et al. | 123/299 |
| 6,125,816 A | * | 10/2000 | Inoue | 123/299 |
| 6,125,823 A | * | 10/2000 | Thomas | 123/299 |
| 6,289,871 B1 | * | 9/2001 | Brown et al. | 123/299 |

FOREIGN PATENT DOCUMENTS

JP          61-272450          12/1986

* cited by examiner

*Primary Examiner*—Willis R. Wolfe
(74) *Attorney, Agent, or Firm*—Foley & Lardner

(57) ABSTRACT

A fuel injection control system is arranged to decide the execution of a pilot fuel injection based on evaluation functions indicative of degree of a pilot fuel injection demand, to decide an engine operating condition, to calculate a fuel injection quantity for each cylinder when the engine operating condition is in the predetermined low-load operating region, to calculate a pilot fuel injection quantity for each cylinder by multiplying a predetermined ratio to the fuel injection quantity in the predetermined low-load operating region and when the pilot fuel injection is executed, and to calculate a main fuel injection quantity by subtracting the pilot fuel injection quantity from the fuel injection quantity. Therefore, this arrangement enables accurate decision as to the execution of the pilot fuel injection and proper control of pilot and main fuel injection quantities.

20 Claims, 19 Drawing Sheets

PILOT INJECTION RATIO MAP

BASIC PILOT INJECTION QUANTITY MAP

CORRECTION COEFFICIENT TABLE

CORRECTION ALLOWABLE LIMITTER TABLE

TARGET VIBRATION LEVEL MAP

MAP OF PILOT INJECTION RATIO LEARNING VALUE

MAP OF PILOT INJECTION QUANTITY LEARNING VALUE

SLICE LEVEL TABLE

FUEL INJECTION CONTROL SYSTEM FOR DIESEL ENGINE

BACKGROUND OF THE INVENTION

The present invention relates to a fuel injection control system for a diesel engine, and more particularly to a system arranged to execute a pilot fuel injection prior to a main fuel injection.

Such a pilot fuel injection is effective to reduce vibrations due to combustion of a diesel engine and is executed when an engine operating condition is in a predetermined operating zone where the combustion vibration of the diesel engine becomes large. Japanese Patent Provisional Publication No. 61-272450 discloses a typical fuel injection control system arranged to execute a pilot injection in a predetermined engine operation zone.

SUMMARY OF THE INVENTION

However, the demand for the pilot fuel injection depends on various factors of an operating condition and internal and external circumstances of the engine. For example, the degree of the demand for the pilot fuel injection varies according to whether the engine is put in a stationary state or transient state. Therefore, it is difficult to appropriately execute the pilot fuel injection in the predetermined engine operation zone.

It is therefore an object of the present invention to provide an improved fuel injection system which is arranged to provide a plurality of membership functions indicative of degree of the demand for executing the pilot fuel injection with respect to the parameters indicative of the engine operating condition as evaluation functions and to decide the execution of the pilot fuel injection on the basis of the evaluation functions so that the decision as to whether the pilot fuel injection should be executed is finely executed even when there is a difference between a stationary state and a transient state or a dispersion in circumstances.

Another object of the present invention is to provide an improved fuel injection system which enables the pilot fuel injection and the main fuel injection to be optimally controlled in a low-load region of the engine operating condition.

A fuel injection control system according to the present invention is for a multi-cylinder diesel engine and comprises a control unit. The control unit is arranged to decide whether a pilot fuel injection is executed, to decide whether an operating condition of the engine is in a predetermined low-load operating region, to calculate a mono-cylinder fuel injection quantity for each cylinder of the engine when the engine operating condition is in the predetermined low-load operating region, to calculate a common fuel injection quantity common among the cylinders of the engine when the engine operating condition is out of the predetermined low-load operating region, to calculate a mono-cylinder pilot fuel injection quantity for each cylinder by multiplying a predetermined ratio to the fuel injection quantity when the engine operating condition is in the predetermined low-load operating region and when the pilot fuel injection is executed, to calculate a common pilot fuel injection quantity common among the cylinders when the engine operating condition is out of the predetermined low-load operating region and when the pilot fuel injection is executed, and to calculate a main fuel injection quantity by subtracting the pilot fuel injection quantity from the fuel injection quantity.

DETAILED DESCRIPTION OF THE INVENTION

Referring to FIGS. 1 to 18B, there is shown a first embodiment of a fuel injection control system for a diesel engine according to the present invention.

Generally, a quantity of NOx generated by combustion in a diesel engine largely depends on a combustion temperature and effectively decreases when the combustion temperature relatively declines. A so-called low-temperature pre-mixture combustion method is arranged to decrease an oxygen density by means of an exhaust gas recirculation (EGR) system and enables the low-temperature combustion thereby.

Figure 1:
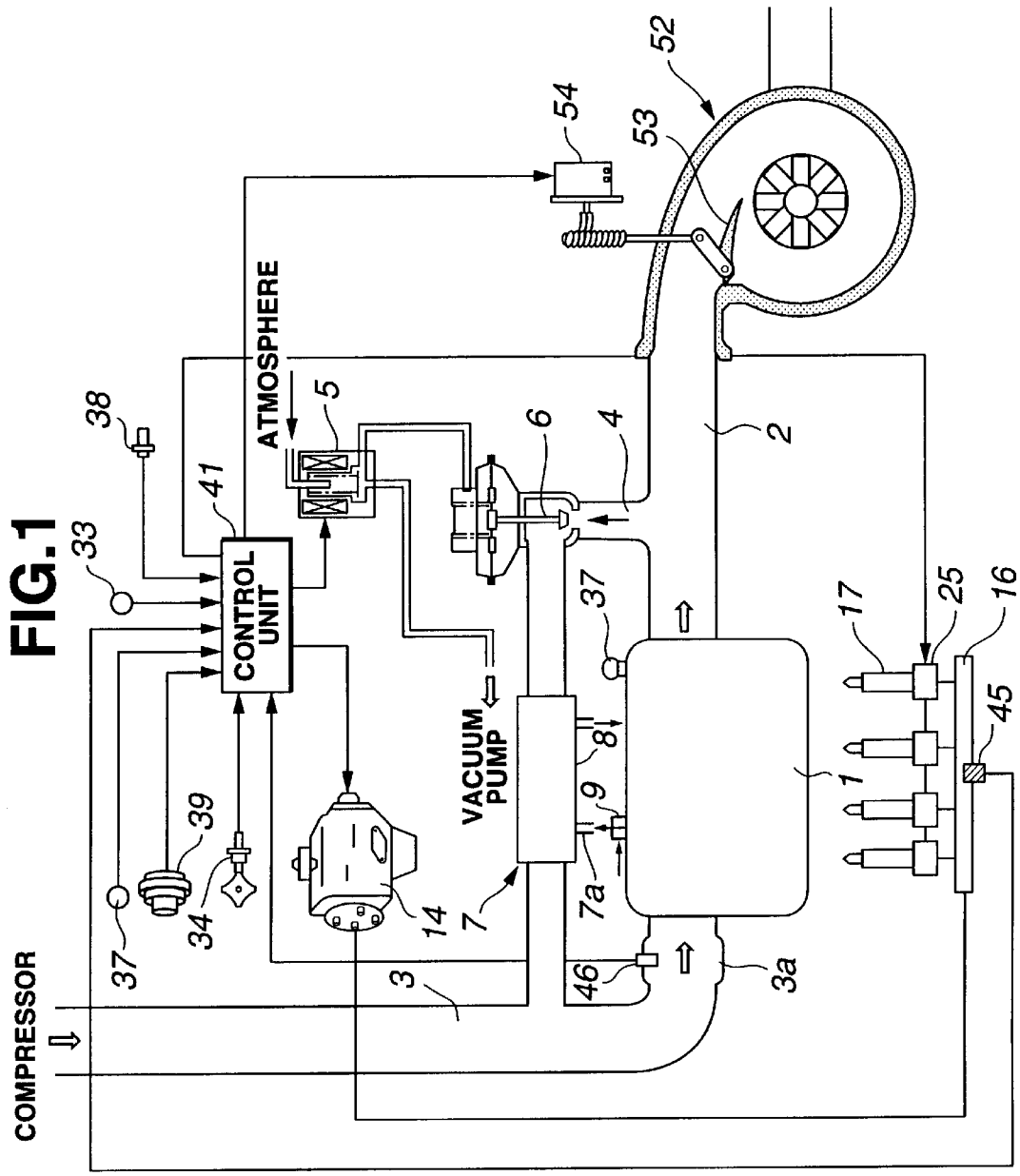
FIG. 1 is a schematic view showing a fuel injection control system of a first embodiment according to the present invention.

As shown in FIG. 1, in this first embodiment, an exhaust passage 2 is connected to an intake passage 3 for a diesel engine 1 through an EGR passage 4. An EGR valve 6 is installed to the EGR passage 4. The EGR valve 6 is of a diaphragm type which opens and closes the EGR passage 4 according to a control negative-pressure supplied from a negative-pressure control valve 5. That is, the EGR valve 6 controls the recirculation of part of the exhaust gas to the intake side of the engine 1.

The negative-pressure control valve 5 is driven by a duty control signal from a control unit 41 so as to ensure an EGR ratio according to the operating condition of the engine 1. More specifically, the control unit 41 is arranged such that the EGR ratio takes 100% at maximum when the engine 1 operates in a low engine rotation speed and low load region. 100% of the EGR ratio means that the flow rate of the EGR gas is equal to the flow rate of the intake air. According to the increase of the engine rotation speed and/or the engine load, the EGR ratio is decreased. Under the high-load condition, the exhaust gas temperature becomes high, and therefore the intake air temperature is increased by recirculating a large quantity of the exhaust gas. This relatively increases the combustion temperature and decreases the reduction effect as to the NOx reduction quantity. Further, since the firing time lag of injected fuel is shortened, it becomes difficult to execute the pre-mixing combustion.

Therefore, the EGR ratio decreases according to the increase of the engine load.

A cooling device 7 for cooling-EGR gas is disposed in the EGR passage 4. The cooling device 7 comprises a water jacket 8 formed around the EGR passage. Part of engine cooling water is supplied to the cooling jacket 8. The quantity of the engine cooling water supplied to the cooling jacket 8 is controlled by a flow rate control valve 9 installed to a coolant inlet 7a of the cooling device 7. The flow rate control valve 9 varies its opening according to a command from the control unit 41 so as to control the cooling degree of the EGR gas.

A swirl control valve (not shown) is disposed in the vicinity of the intake port of the engine 1. The control unit 41 controls an opening of the swirl control valve so as to decrease the opening when the engine 1 is operated in the engine low load region. By decreasing the opening of the swirl control valve, the flow speed of the intake air into combustion chambers of the engine 1 is raised up, and therefore strong swirl is generated in each combustion chamber. By the strong swirl, the heat exchange efficiency of operation gas in the combustion chambers increases, and therefore the temperature of the operation gas relatively decreases.

Each piston of the engine 1 has a piston cavity (combustion chamber) formed by depressing a top land of the piston into a toroidal shape. More specifically, the piston cavity is cylindrically depressed from the top land and has a conical portion at a center of a bottom surface of the piston cavity. The conical portion functions to decrease the flow resistance to the swirl spirally lashed in the piston cavity during the second half of the compression process so as to improve the mixing of air and fuel.

This non-choked cylindrical piston cavity functions to diffuse the swirls generated by the swirl control valve from the piston cavity to the outside of the piston cavity according to the down stroke of the piston during the combustion process and maintains the swirls out of the piston cavity.

An exhaust turbine 52 of a turbocharger is connected to the exhaust passage 2 downstream of an inlet port of the EGR passage 4. The turbocharger has a variable vane 53 driven by a stepping motor 54 at a scroll inlet of the exhaust turbine 52. The control unit 41 controls the variable vane 53 so that the turbocharger generates a predetermined charged pressure from a low engine rotation speed range. More specifically, the vane angle of the variable vane 53 is set at an angle for increasing a flow speed flowed into the exhaust turbine 52 during a low engine rotation speed region, and is set at an open angle for smoothly flowing the exhaust gas in the exhaust turbine 52 so as to minimize the flow resistance of the variable vane 54. Further, the control unit 41 controls the vane angle of the variable vane 53 so as to generate a desired charged pressure.

As shown in FIG. 1, a fuel injection device of a common rail type is installed to the engine 1. The fuel injection device comprises a fuel tank (not shown), a supply pump 45, a common rail (accumulator chamber) 16 and fuel injectors 17 for respective cylinders #1–#4 of the engine 1. Highly pressurized fuel pressurized by the supply pump 14 is stored in the common rail 16. Each fuel injector 17 controls start and end of fuel injection by opening and closing a nozzle needle of the injection 17 through the control of a three-way valve 25 installed in each injection 17 according to a signal from the control unit 41. Fuel pressure in the common rail 16 is controlled at an optimum pressure preferable for the engine 1 by means of the pressure sensor (not shown) and a discharge quantity control mechanism (not shown) of the supply pump 14.

The control unit 41 controls the fuel injection quantity, the injection timing and the fuel pressure. The control unit 41 is constituted by a microprocessor, a RAM (random access memory), a ROM (read only memory) and peripheral devices. The control unit 41 is connected to an accelerator opening sensor 33, a sensor 34 for detecting the engine rotation speed and a crank angle, a sensor (not shown) for deciding the cylinder number, an acceleration sensor 37 for detecting a vibration level of the engine 1 and a water temperature sensor 38 and receives detection signals therefrom. The control unit 41 calculates a target fuel injection quantity and a target fuel injection timing according to the engine rotation speed and the accelerator opening based on the signals from the sensors. The control unit 41 controls an ON time period of the three-way valve 25 corresponding to the target injection timing. Further, the control unit 41 executes a feedback control of the fuel pressure of the common rail 16 through the discharge quantity control mechanism of the supply pump 14 so as to bring the common rail pressure detecting by the pressure sensor closer to a target pressure.

For the purpose of enabling the low temperature premixing combustion, the fuel injection timing is retarded as compared with a normal injection timing. More specifically, a start timing of the fuel injection is set within a predetermined crank-angle range after a compression upper death point. This special setting elongates the ignition delay period of the injected fuel. Therefore, the vaporization of the injected fuel is promoted during this delay period, and the ignition is executed under the sufficiently mixed condition of air and fuel. Consequently, the low-temperature pre-mixing combustion can be executed under a low oxygen density due to the exhaust gas recirculation. During this period, the pattern of heat generation takes a single-step combustion which enables the reduction of NOx without increasing particulates.

Hereinafter, the "low-temperature pre-mixing combustion" denotes a combustion where the pattern of heat generation takes a single-step combustion by largely retarding the fuel injection timing under a low-oxygen density condition. Such a combustion is disclosed in Japanese Patent Provisional Publication 7-4287.

The pilot fuel injection effectively functions to reduce the combustion vibration of the diesel engine and to increase a compression-end temperature.

However, the demand of the pilot fuel injection depends on whether the engine operating condition is in a stationary condition or transient condition. Further, the demand depends on circumstances of the engine 1. Since a conventional system has been merely adapted to the stationary condition, it cannot be adapted to the transient condition. Accordingly, the conventional system cannot calculate a proper pilot injection quantity according to change of the circumstance, and rather degrades vibration level of the engine or exhaust emission.

In order to improve such insufficient operation of the conventional system, the control unit 41 employed in the fuel injection control system according to the present invention is arranged to prepare membership functions representing a degree of the demand for the pilot fuel injection with respect to parameters indicative of the engine operating condition as evaluation functions. Further, the control unit 41 is arranged to execute a decision as to whether the pilot injection should be executed, on the basis of the evaluation functions.

With reference to flowcharts shown in FIGS. 2 and 3, the manner of control executed by the control unit 41 will be discussed.

Figure 2:
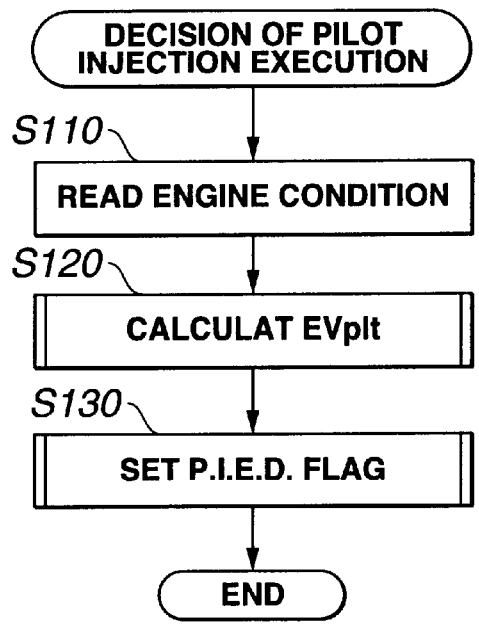
FIG. 2 is a flowchart showing a programmed routine for deciding an execution of a pilot fuel injection.

FIG. 2 shows a flowchart for deciding whether the pilot injection should be executed or not, and this programmed routine is executed at predetermined time intervals or as a background job.

At a step S110 of FIG. 2, the control unit 41 reads parameters indicative of the engine operating condition from the sensors 33, 34, 37, 38, 39, 45, and 46.

At a step S120, the control unit 41 calculates a decision value EVplt on the basis of evaluation functions. The calculation of the decision value EVplt is executed by a subroutine shown in FIG. 3.

At a step S130, the control unit 41 sets a P.I.E.D. (pilot injection execution decision) flag fpilot employed in the decision as to whether the pilot injection is executed or not. This setting of the flag fpilot is executed by a subroutine shown in FIG. 13.

Figure 3:
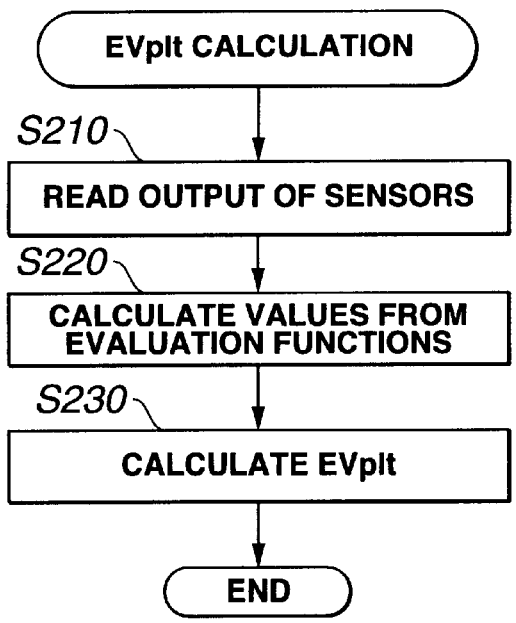
FIG. 3 is a flowchart showing a programmed routine for calculating a decision value EVplt.

The subroutine for calculating the decision value EVplt is executed at predetermined time intervals, as follows:

At a step S210 of a flowchart of FIG. 3, the control unit 41 reads parameters indicative of the engine operating condition. The parameters include the outputs of the sensors 33, 34, 37, 38, 39, 45, and 46 connected to the control unit 41 and the calculation value executed by the control unit 41.

At a step S220, the control unit 41 retrieves tables indicative of the evaluation functions shown in FIGS. 4 to 12 from the outputs of the sensors and the calculation values. By the retrievals of the tables, the control unit 41 calculates the values EVpm, EVqa, EVlb, EVqf, EVrl, EVgs, EVtw, EVeg and EVtaq of the respective evaluation functions with respect to (1) intake pressure, (2) intake air quantity, (3) target excess air ratio, (4) target fuel injection quantity Qf, (5) a ratio of an actual common rail pressure to a target common rail pressure, (6) an integral of the output from the acceleration sensor 37 installed to a cylinder block of the engine 1, (7) a cooling water temperature, (8) a target EGR ratio, and (9) an intake air temperature. Then, the maximum one of the six basic values EVpm, EVqa, EVlb, EVqf, EVrl, and EVgs are selected.

At a step S230, the control unit 41 calculates a decision value EVplt by multiplying the selected maximum value by the later three correction values EVtw, EVeg and EVtaq.

Herein, the intake pressure of the engine 1 is detected by a pressure sensor 46 installed to an intake corrector portion 3a. The intake airflow rate is detected by an airflow meter 39 installed at an upstream of a compressor of the turbocharger 52 in the intake passage 3. The intake air temperature is detected by a temperature sensor installed at an upstream of the airflow meter 39 in the intake passage 3. The target excess air ratio, the target fuel injection quantity Qf, the target common rail pressure, the target EGR ratio are calculation values employed in the engine control, and the calculation method thereof are commonly known. For example, the target fuel injection quantity Qf is obtained by retrieving a predetermined map as to a basic fuel injection quantity from the engine rotation speed and the accelerator opening and by incrementally correcting the basic fuel injection quantity with respect to the engine operating condition such as the cooling water temperature. Similarly, the target excess air ratio and the target common rail pressure and the target EGR ratio are obtained by retrieving predetermined maps from the engine rotation speed and the target fuel injection quantity Qf.

Figure 4:
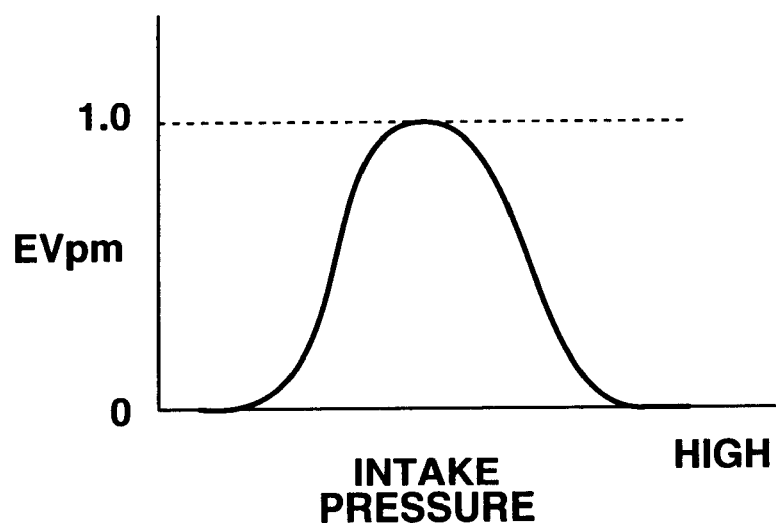
FIG. 4 is a characteristic curve of an evaluation function with respect to intake air pressure.
Figure 5:
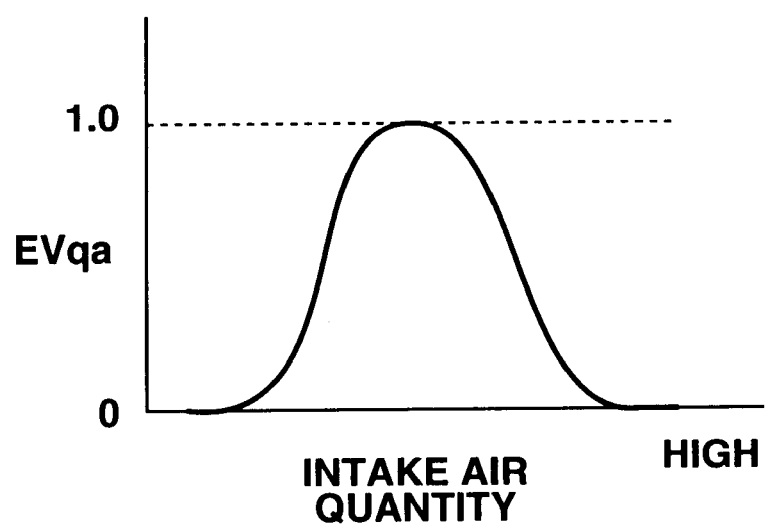
FIG. 5 is a characteristic curve of an evaluation function with respect to intake air flow rate.

The evaluation functions shown in FIGS. 4 to 8 are membership functions representative of the degree of the demand for executing the pilot fuel injection. In FIGS. 4 to 8, a value 1.0 of the vertical axis represents the maximum demand of the pilot fuel injection, and a value 0 of the vertical axis represents the minimum demand of the pilot fuel injection. More particularly, in FIGS. 4 and 5, when the engine operating condition is in a low intake pressure region, or in a small intake air quantity region (low load region), it is possible to execute the low-temperature pre-mixing combustion by using a large quantity of EGR gas. The low-temperature pre-mixing combustion suppresses vibrations due to the combustion, and therefore the demand for executing the pilot fuel injection is small in this situation. When the intake air pressure becomes in an intermediate region, it becomes difficult to control the combustion by means of the control of EGR. That is, in this intermediate intake-pressure region, the pattern of the combustion generally transits from the low-temperature pre-mixing combustion to a diffusion combustion. Therefore, the vibration level due to the combustion raises up, and the demand for executing the pilot fuel injection increases. On the other hand, when the intake pressure becomes high and is in a high intake pressure region, or when the intake air quantity becomes high and is in a high intake air quantity region, the intake air is charged by the turbocharger. Therefore, in this high intake pressure or high intake air quantity region, the vibration level due to the combustion becomes small, and therefore the demand for executing the pilot fuel injection becomes small. Consequently, the degree of the demand for executing the pilot fuel injection is varied so as to form a wave formed curve having a peak at an intermediate region, as shown in FIGS. 4 and 5.

Figure 6:
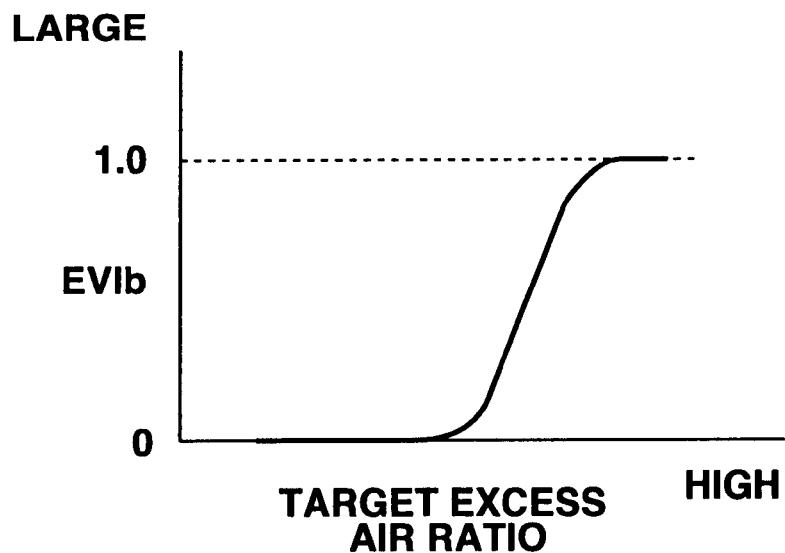
FIG. 6 is a characteristic curve of an evaluation function with respect to a target excess air ratio.

Further, when the target excess air ratio is large, it is hard to promote the low-temperature pre-mixing combustion. Therefore, the vibration level due to the combustion tends to become high, and the demand for executing the pilot fuel injection becomes high. That is, as shown in FIG. 6, the demand for executing the pilot fuel injection is varied so as to radically increase in a high region of the excess air ratio.

Figure 7:
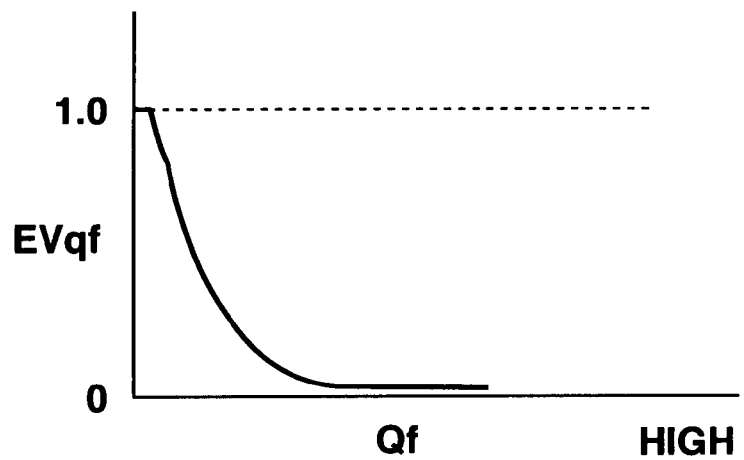
FIG. 7 is a characteristic curve of an evaluation function with respect to a target fuel injection quantity.

As to a relationship between the target fuel injection quantity Qf and the degree of the pilot fuel injection demand, the degree of the demand for executing the pilot fuel injection becomes high in a small region of the target fuel injection quantity Qf, as shown in FIG. 7. The purpose of executing the pilot fuel injection in this small injection quantity region is for raising the compression end temperature and not for reducing the vibration level due to the combustion. For example, some types are arranged to decrease the compression ratio in order to execute the low-temperature pre-mixing combustion. For these types, the pilot fuel injection functions to effectively increase the compression-end temperature.

Figure 8:
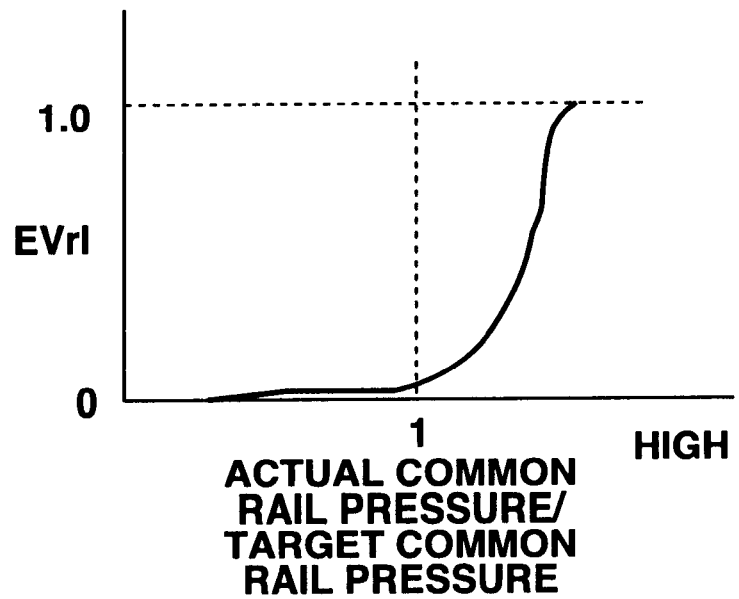
FIG. 8 is a characteristic curve of an evaluation function with respect to a ratio of an actual common rail pressure with respect to a target common rail pressure.
Figure 9:
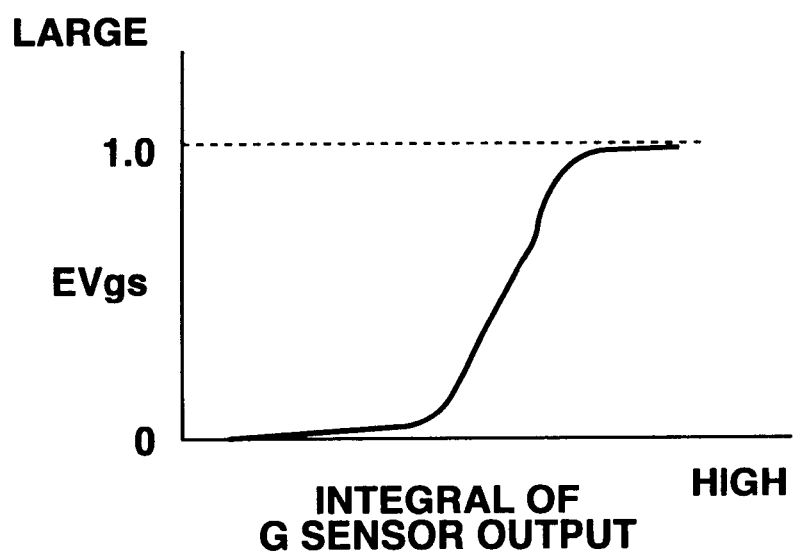
FIG. 9 is a characteristic curve of an evaluation function with respect to an integral of an output of an acceleration sensor.

Further, when a ratio of the target common rail pressure with respect to the actual common rail pressure is greater than 1, the vibration level due to the combustion becomes greater than a demanded value. Therefore, the demand for executing the pilot fuel injection increases according to the increase of the ratio greater than 1, as shown in FIG. 8. When an integral of the output of the acceleration sensor 37 becomes greater than a predetermined value, the demand for executing the pilot fuel injection radically increases as shown in FIG. 9.

Figure 10:
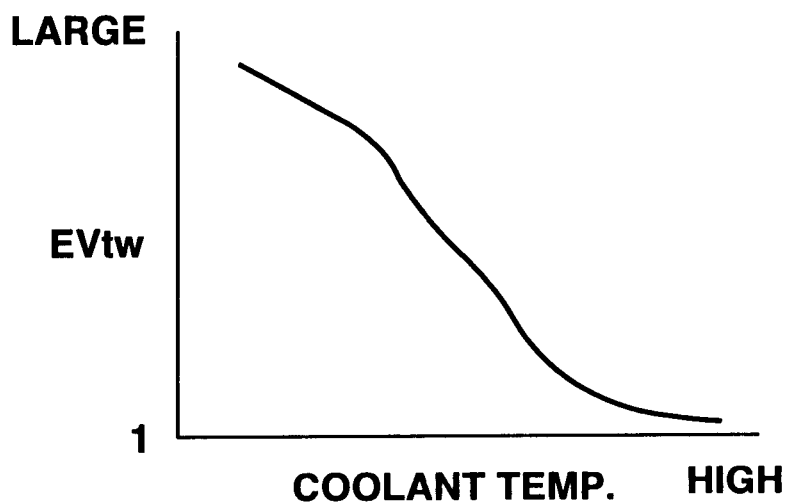
FIG. 10 is a characteristic curve of an evaluation function with respect to a cooling water temperature.
Figure 11:
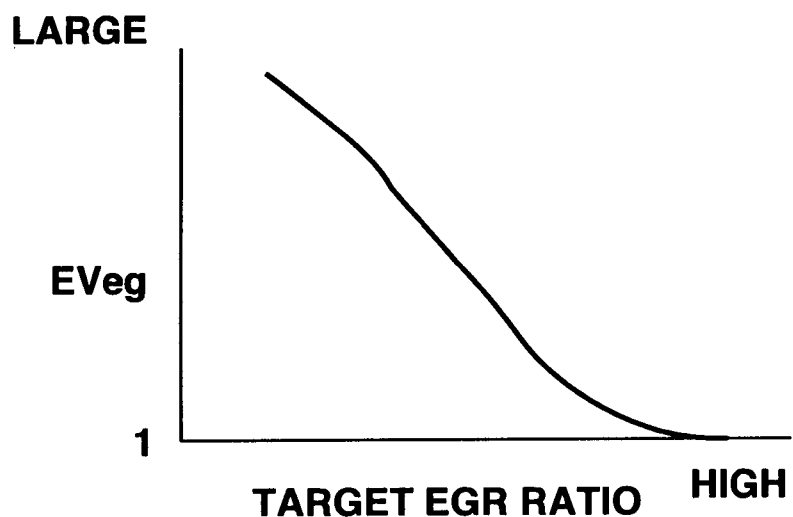
FIG. 11 is a characteristic curve of an evaluation function with respect to a target EGR ratio.
Figure 12:
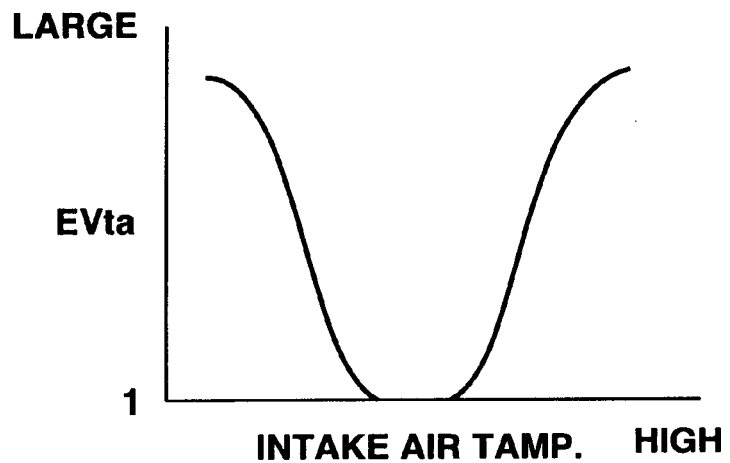
FIG. 12 is a characteristic curve of an evaluation function with respect to an intake air temperature.

On the other hand, the evaluation functions of FIGS. 10, 11 and 12 are correction calculation functions for the evaluation functions of FIGS. 4 to 8 which operate as basic value calculation functions. More specifically, when the cooling water temperature is low, it is necessary to raise the compression-end temperature. That is, the degree of the demand for executing the pilot fuel injection increases according to the lowering of the cooling water temperature, as shown in FIG. 10. Further, when the target EGR ratio is small, it is difficult to execute the low-temperature pre-mixing combustion. Therefore, the degree of the demand for executing the pilot fuel injection is corrected so as to increase according to the decrease of the EGR ratio, by using the correction calculation function shown in FIG. 11. Regarding the intake air temperature, when the intake air temperature is in a low intake air temperature region, the degree of the demand is corrected to a larger value to increase the compression-end temperature by using the correction calculation function obtained from the function of FIG. 12. When the intake air temperature is in an intermediate intake air temperature region, the degree of the demand is corrected to a smaller value by using the correction calculation function obtained from FIG. 12 since the low-temperature pre-mixing combustion is executed in this intermediate region of the intake air temperature. When the intake air temperature is in a high intake air temperature region, the degree of the demand is corrected to a larger value by using the correction calculation function obtained from FIG. 12 since it becomes difficult to execute the low-temperature pre-mixing combustion due to the raising of the in-cylinder temperature.

Further, it will be understood that an actual excess air ratio and an actual EGR ratio may be employed as parameters representative of the engine operating condition instead of the target excess air ratio and the target EGR ratio.

FIGS. 4 to 12 show the evaluation functions indicative of relationships between the degree of the demand for executing the pilot fuel injection and the parameters indicative of the engine operating condition. Some types of an engine will not require several evaluation functions thereof. For example, even if one of FIGS. 4 and 5 may not be employed, the decision as to whether the pilot fuel injection is executed will be made. Further, if the diesel engine does not employ a common rail type fuel injection device, it is not necessary to employ the evaluation function of FIG. 8.

Further, it will be understood that the evaluation functions of FIGS. 10 to 12 may be set as the basic value calculation functions and that the evaluation functions of FIGS. 4 to 8 may be set as correction calculation functions. Furthermore, all of the evaluation functions may be set as the basic value calculation functions. The merit for dividing the plurality of evaluation functions into the basic value calculation functions and the correction value calculation functions is to enable the facilitation of the adaptation of whole evaluation functions.

Next, a programmed routine for setting the P.I.E.D. flag fpilot will be explained with reference to a flowchart of FIG. 13. This programmed routine is executed at predetermined time intervals.

At a step S310, the control unit 41 decides whether the decision value EVplt is greater than a slice level SLEV# or not. When the decision at the step S310 is affirmative (EVplt>SLEV#), the routine proceeds to a step S320 wherein the control unit 41 sets the P.I.E.D. flag fpilot at 1 (fpilot=1). When the decision at the step S310 is negative (EVplt≦SLEV#), the routine proceeds to a step S330 wherein the control unit 41 sets the P.I.E.D. flag fpilot at 0 (fpilot=0).

Figure 17:
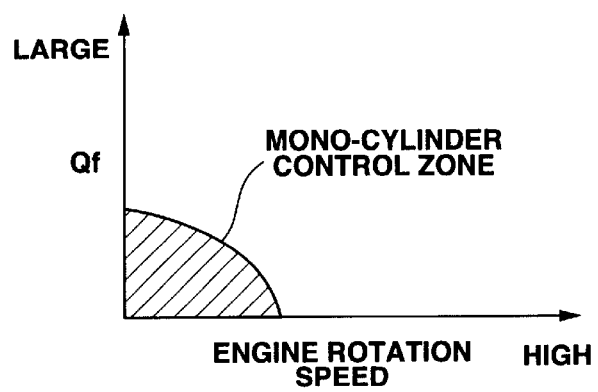
FIG. 17 is a map showing a mono-cylinder control zone in an engine operating condition.

As to a mono-cylinder control (independent cylinder control) of the main fuel injection relating to the pilot fuel injection, the explanation thereof will be discussed hereinafter. As shown in FIG. 17, the mono-cylinder control is executed when the engine operating condition is in a zone marked by hatchings. Hereinafter, the hatching zone is called a mono-cylinder control zone. When the engine operating condition is in the mono-cylinder control zone, the rotational fluctuation is generated by the dispersion of the fuel injection quantity among the cylinders of the engine 1. Therefore, the mono-cylinder control is executed in order to avoid this rotational fluctuation. The mono-cylinder control is executed by the following manner. First, the control unit 41 calculates a second differential of the engine rotation speed of each cylinder and compares the calculated second differential corresponding to a torque with a target value. If the calculated torque is smaller than the target torque, the fuel injection quantity is incrementally corrected so that the torque is increased. In reverse, if the calculated torque is greater than the target torque, the fuel injection quantity is decrementally corrected so that the torque is decreased. By this mono-cylinder control, the total quantity of the fuel injection quantity for each cylinder becomes different from others after the execution of the mono-cylinder control. The low load region for executing the mono-cylinder control includes an idling period. The pilot fuel injection executed in the low load region supplies energy for raising up the compression end pressure to the engine. Therefore, the control of the fuel injection quantity is basically controlled in the absolute value.

Figure 18A:
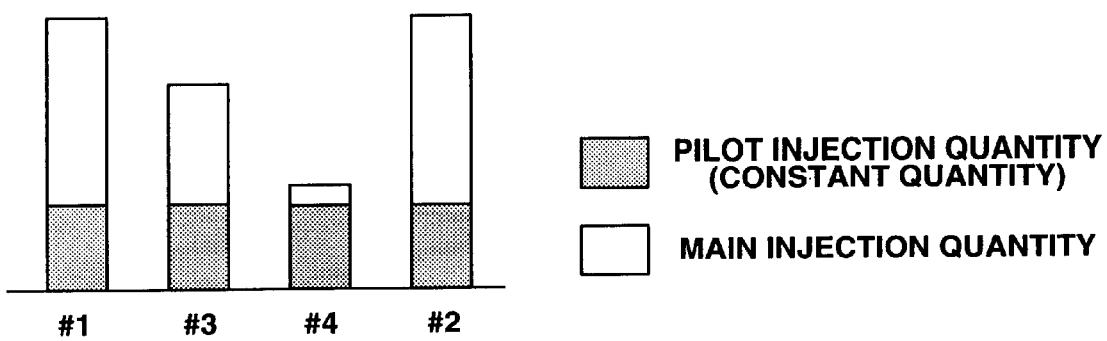
FIG. 18A is a graph explaining a conventional pilot fuel injection method.

In this case, if it is assumed that part of fuel injection quantity for the main fuel injection is used in the pilot fuel injection in the mono-cylinder control zone, the limiting of the minimum fuel injection quantity is determined by a cylinder where the total fuel injection quantity is small. For example, if the pilot fuel injection is executed so as to be equivalent in an absolute value among the cylinders during idling, almost of the fuel injection quantity in the cylinder #4 is occupied by the quantity of the pilot fuel injection as shown in FIG. 18A. Therefore, the quantity of the main fuel injection becomes extremely small, and therefore in some case, the quantity of the main fuel injection becomes smaller than the minimum flow rate of the fuel injector. In such a case, it becomes impossible to execute the main fuel injection accurately.

Accordingly, when the pilot fuel injection is executed in the mono-cylinder control zone, the quantity of the pilot fuel injection is controlled in ratio and not in absolute value. More specifically, according to the present invention, the fuel injection quantity of the pilot fuel injection is set at a value obtained by multiplying a predetermined ratio with the total fuel injection quantity after the execution of the mono-cylinder control.

Figure 14:
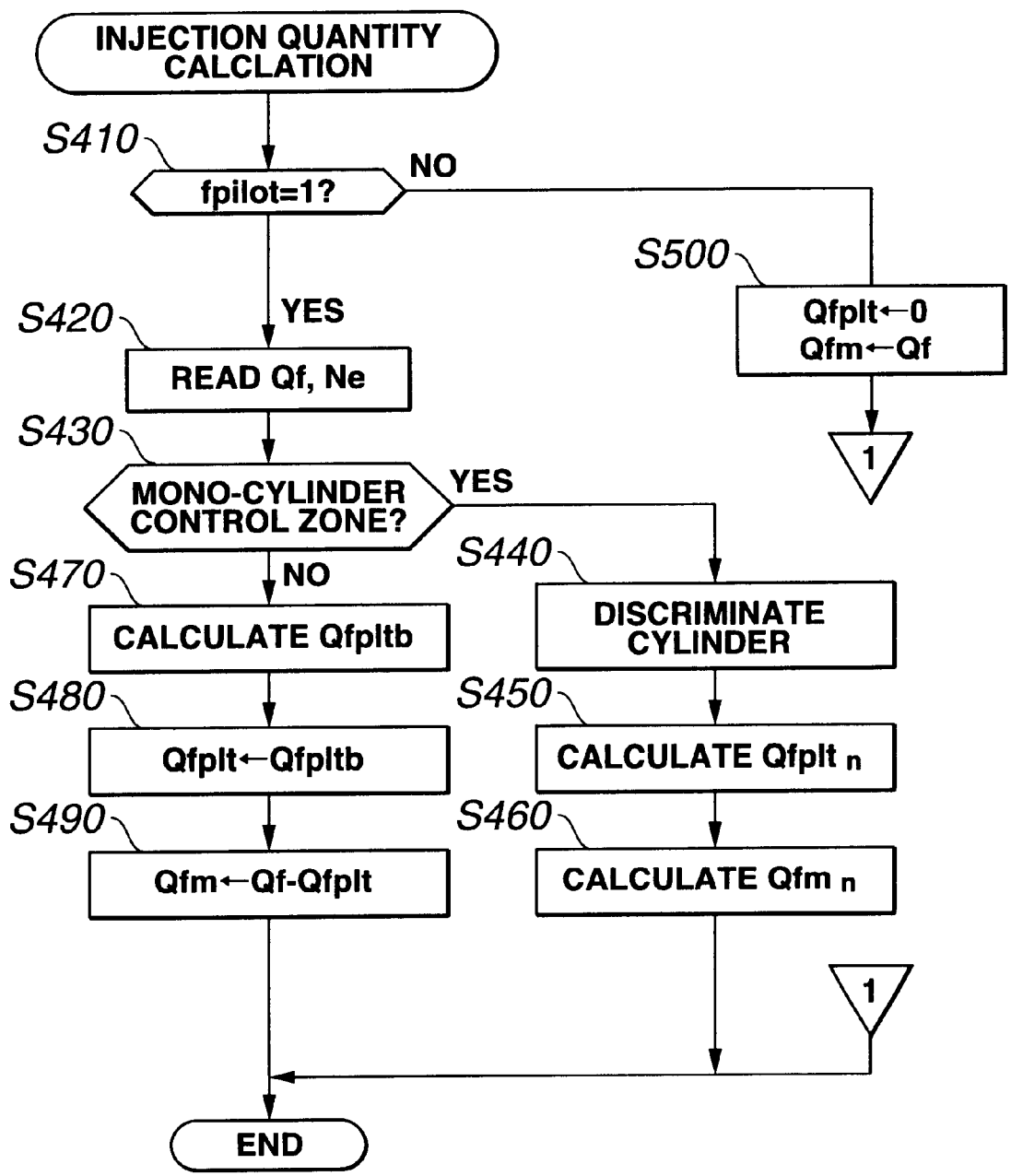
FIG. 14 is a flowchart of a programmed routine for calculating a fuel injection quantity.

With reference to a flowchart of FIG. 14, a programmed routine for calculating the fuel injection quantity of the pilot fuel injection and the main fuel injection will be discussed. This programmed routine is executed at every inputs of crank reference position signal. In case of four cylinder engine, the programmed routine is executed by every angles of 180°. In case of six cylinder engine, the programmed routine is executed at every angles of 120°.

At a step S410, the control unit 41 decides whether fpilot=1 or not. When the decision at the step S410 is affirmative (fpilot=1), the routine proceeds to a step S420. When the decision at the step S410 is negative (fpilot=0), the routine proceeds to a step S500.

At the step S420, the control unit 41 reads the engine rotation speed Ne and the target fuel injection quantity Qf.

At a step S430, the control unit 41 decides whether the engine operating condition is in the mono-cylinder control zone or not. When the decision at the step S430 is affirmative, the routine proceeds to a step S440. When the decision at the step S430 is negative, the routine proceeds to a step S470.

At the step S440, the control unit 41 executes a cylinder discrimination for discriminating cylinders #1–#4 of the engine 1.

At a step S450, the control unit 41 calculates a fuel injection quantity $Qfplt_n$ of the pilot fuel injection for each discriminated cylinder from the following equation (1):

$$Qfplt_n = Rplt \times (Qf + QADC_n), \quad (1)$$

where Rplt is a pilot injection ratio, $QADC_n$ is a controlled quantity of each cylinder, and a suffix n denotes a cylinder number #1–#4. The controlled quantity QADC, for each cylinder is a correction quantity of each cylinder for eliminating the fluctuation of the fuel injection quantity by each cylinder, and is obtained by a calculation routine (not shown). The controlled quantity for each cylinder takes a value different from the other controlled quantity for the other cylinders. This mono-cylinder control is normally known in the field of the fuel injection control, and therefore the further explanation thereof is omitted.

Figure 15:
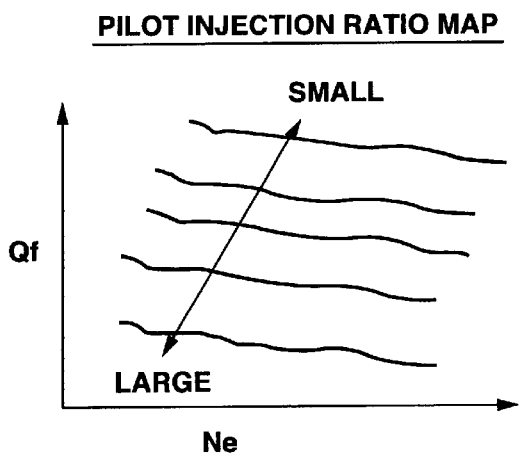
FIG. 15 is a map showing a pilot injection ratio with respect to an engine rotation speed and a target fuel injection quantity.

The pilot injection ratio Rplt is obtained by retrieving mapped data corresponding to a graph showing a relationship among the pilot injection ratio Rplt, the engine rotation speed Ne and the target fuel injection quantity Qf shown in FIG. 15.

In the mono-cylinder control zone, the pilot fuel injection quantity Qfplt is obtained by multiplying the predetermined pilot injection ratio Rplt with the total fuel injection quantity $(Qf+QADC_n)$ after the mono-cylinder control.

At a step S460, the control unit 41 calculates the main fuel injection quantity $Qfm_n$ (n: cylinder number) of each cylinder #1–#4 of the engine 1 from the following equation (2):

$$Qfm_n = (Qf + QADC_n) - QFplt_n. \quad (2)$$

That is, the main fuel injection quantity $Qfm_n$ is a remaining quantity obtained by subtracting the pilot fuel injection quantity $Qfplt_n$ from the total fuel injection quantity $Qf+QADC_n$.

On the other hand, when the engine operating condition is out of the mono-cylinder control zone, that is, when the decision at the step S430 is negative, the routine proceeds to a step S470.

Figure 16:
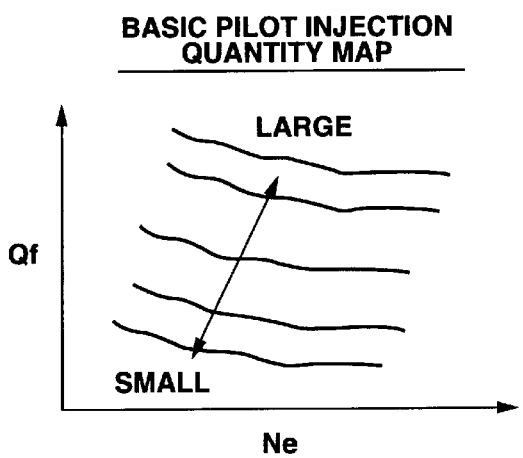
FIG. 16 is a map showing a basic pilot fuel injection quantity with respect to the engine rotation speed and the target fuel injection quantity.

At the step S470, the control unit 41 calculates the basic pilot fuel injection quantity Qfpltb by retrieving mapped data corresponding to a graph shown in FIG. 16 from the target fuel injection quantity Qf and the engine rotation speed Ne.

At a step S480, since the control unit 41 decided at the step S430 that the engine operating condition is out of the mono-cylinder control zone, the basic pilot fuel injection quantity Afpltb is treated as the pilot fuel injection quantity Qfplt (Qfplt←Qfpltb).

At the step S490, the control unit 41 calculates the main injection quantity Qfm by subtracting the pilot fuel injection quantity Qfplt from the total fuel injection quantity Qf (Qfm←Qf−Qfplt).

Further, at the step S500 following to the negative decision at the step S410, the control unit 41 sets the pilot fuel injection quantity Qfplt at 0 (Qfplt←0) and the main fuel injection quantity Qfm at Qf (Qfm←Qf).

After the execution of the step S460, S490 or S500, the present routine is terminated.

That is, by using the pilot fuel injection quantity Qfplt and the main fuel injection quantity Qfm calculated, the pilot fuel injection is executed during the pilot fuel injection period. Further, when the engine operating condition is in the mono-cylinder control zone, by using the pilot fuel injection quantity $Qfplt_n$ for each cylinder and the main fuel injection quantity $Qfm_n$ for each cylinder and a flowchart (not shown), the pilot fuel injection is executed during the pilot fuel injection period. At the main fuel injection period immediately after the pilot fuel injection period, the main fuel injection is executed. The pilot fuel injection period is set so that the pilot fuel injection is terminated before the start of the main fuel injection.

With the thus arranged first embodiment, the membership functions representative of the degree of the demand for executing the pilot fuel injection with respect to the parameters representative of the engine operating condition is set as the evaluation functions. Therefore, it is possible to quantify the degree of the demand from the membership function even if the degree of the demand for executing the pilot fuel injection is in a range not in the maximum range and in the minimum range, that is, in an ambiguous (fuzzy) range. Accordingly, the decision value EVplt is determined on the basis of the evaluation functions of the membership functions and the decision as to the execution of the pilot fuel injection is made by comparing the decision value EVplt with the slice level SLEV#. Consequently, it becomes possible to improve the decision accuracy as to whether the pilot fuel injection is executed, even if the engine operating condition is in a fluctuated circumstance (dispersion) or regardless the stationary state or transient state. This improvement in decision accuracy enables both of the vibration level and the exhaust emission to be improved. Further, since the setting of the membership functions including the fuzzy factors does not require the accurate data, the adaptation of the membership functions are largely facilitated.

Figure 18B:
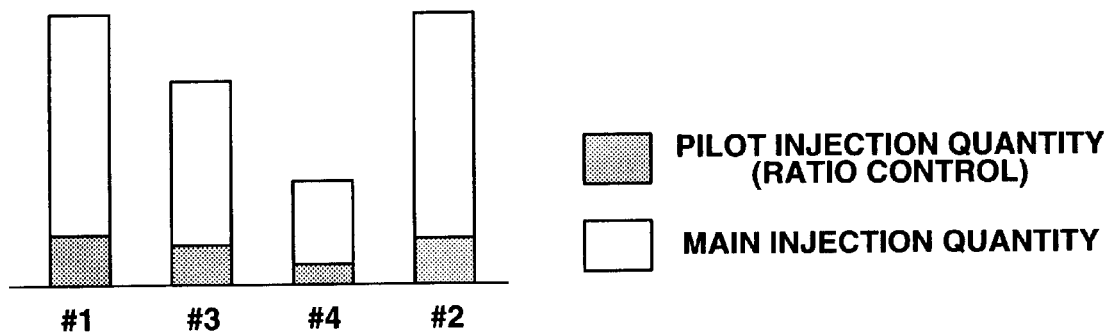
FIG. 18B is a graph explaining the pilot fuel injection method according to the present invention.

Furthermore, when the correction as to the dispersion of torque among cylinders is executed in a low-load region including an idling operation, the fuel injection quantity is dispersed among cylinders. If the quantity of the pilot fuel injection is determined at a common value in this situation as shown in FIG. 18A showing a conventional art, there is a possibility that as to a cylinder the rate of the pilot fuel injection in the fuel injection quantity becomes too large and the rate of a main fuel injection quantity of a cylinder becomes too small so that the injector cannot inject the too-small quantity of the main fuel injection, as shown by a cylinder #4 of FIG. 18A. In contrast to this, the first embodiment of the fuel injection control system according to the present invention is arranged to determine the quantity $Qfplt_n$ of the pilot fuel injection for each cylinder at a value obtained by multiplying the predetermined ratio Rplt by the corrected total fuel injection quantity ($Qf+AADC_n$) so that the quantity of the pilot fuel injection and the quantity of the main fuel injection are properly controlled as shown in FIG. 18B even under the low-load region where the dispersion correction among cylinders is executed.

Figure 19:
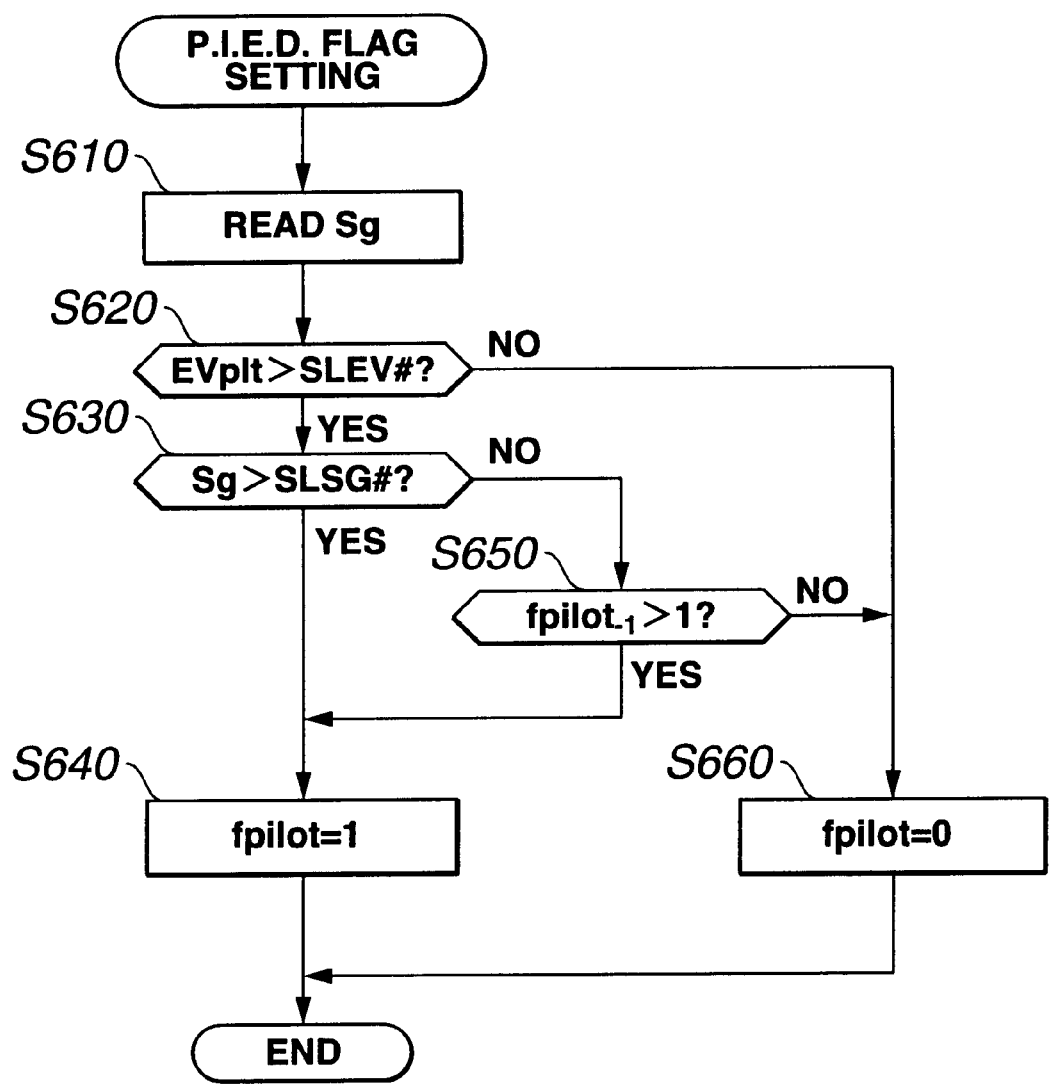
FIG. 19 is a flowchart of a programmed routine for setting the pilot injection execution decision flag of a second embodiment according to the present invention.
Figure 20:
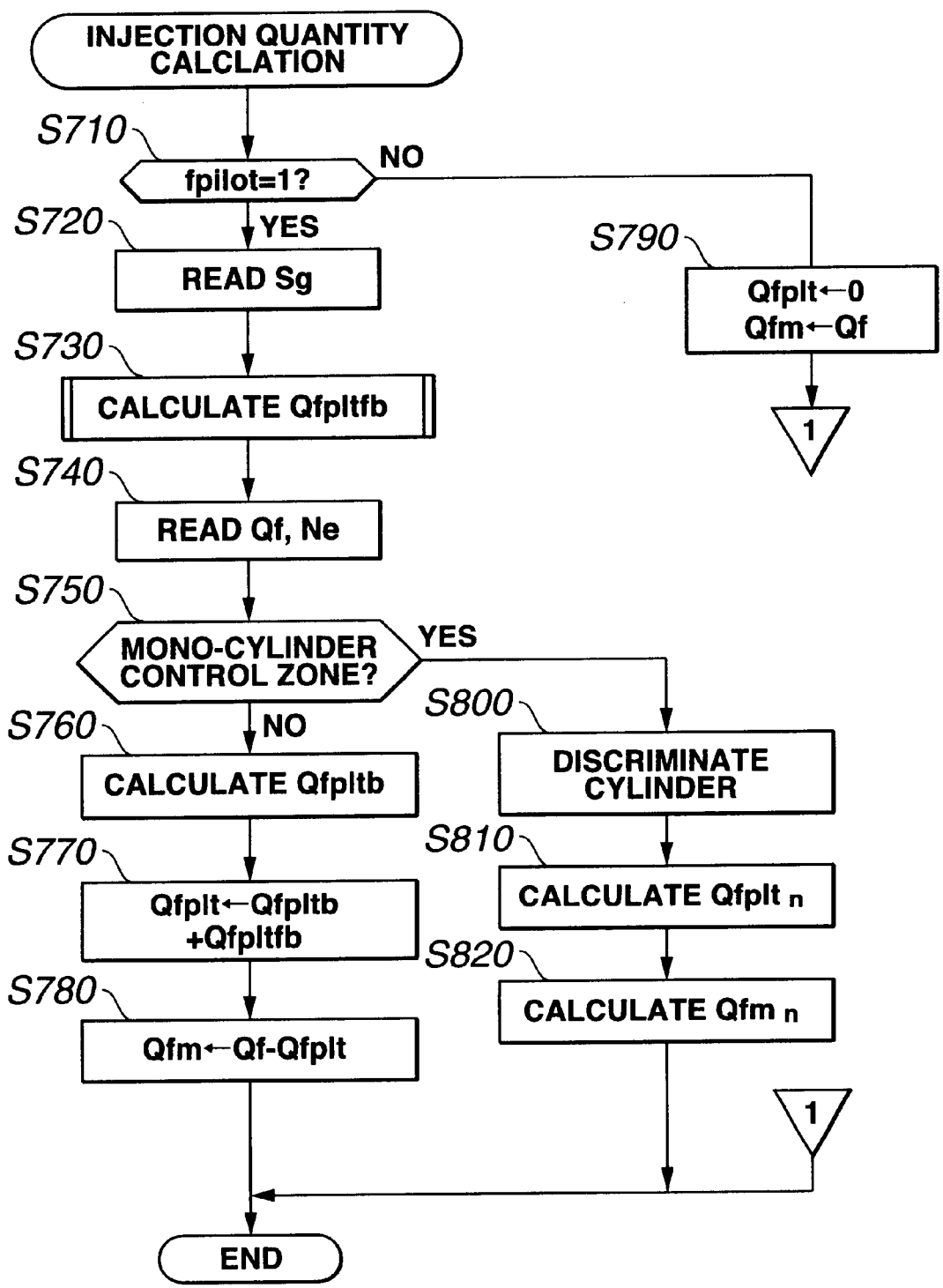
FIG. 20 is a flowchart of a programmed routine for calculating the fuel injection quantity employed in the second embodiment.

With reference to FIGS. 19 to 24, a second embodiment of the fuel injection control system according to the present invention will be discussed. The basic construction of the second embodiment is as same as that of the first embodiment shown in FIG. 1. The second embodiment is characteristically arranged so that the programmed routines shown by flowcharts of FIGS. 19 and 20 are executed instead of the programmed routines shown in FIGS. 13 and 14 of the first embodiment.

Regarding the P.I.E.D. flag setting routine of the second embodiment, the following steps are executed as shown by the flowchart of FIG. 19.

At a step S610, the control unit 41 reads the integral Sg of the output of the acceleration sensor 37.

At a step S620, the control unit 41 decides whether or not the decision value EVplt is greater than the slice level SLEV#. When the decision at the step S620 is affirmative (EVplt>SLEV#), the routine proceeds to a step S630. When the decision at the step S620 is negative (EVplt≦SLEV#), the routine jumps to a step S660.

At the step S630, the control unit 41 decides whether the integral Sg of the output of the acceleration sensor 37 is greater than a slice level SLSG# or not. When the decision at the step S630 is affirmative (Sg>SLSG#), the routine proceeds to a step S640 wherein the control unit 41 sets the P.I.E.D. flag fpilot at 1 (fpilot=1). When the decision at the step S630 is negative (Sg≦SLSG#), the routine proceeds to a step S650.

At the step S640 following to the affirmative decision at the step S630, the control unit 41 sets the P.I.E.D. flag fpilot at 1 (fpilot=1).

At the step S650 following to the negative decision at the step S630, the control unit 41 decides whether a past P.I.E.D. flag $fpilot_{-1}$ indicative of the previous pilot injection state is set at 1 or not. That is, the control unit 41 decides whether or not the pilot fuel injection was executed in the previous routine. When the decision at the step S650 is affirmative, that is, when the control unit 41 decides that the pilot fuel injection was executed in the previous routine, the routine proceeds to the step S640. When the decision at the step S650 is negative, the routine proceeds to the step S660.

At the step S660, the control unit 41 sets the P.I.E.D. flag fpilot at 0 (fpilot=0).

After the setting of the P.I.E.D. flag fpilot, the routine proceeds to an end block to terminate the present routine.

Regarding the programmed routine for calculating the fuel injection quantity employed in the second embodiment, the manner thereof will be discussed with reference to the flowchart of FIG. 20. This routine is particularly programmed to execute a feedback control of the pilot fuel injection quantity on the basis of the integral Sg of the output of the acceleration sensor 37 when the engine operating condition is in the pilot fuel injection region and is out of the mono-cylinder control zone. More specifically, steps S720 and S730 are newly added, and a step S770 is prepared instead of the step S480 of the flowchart of FIG. 14. The other steps in the flowchart of FIG. 20 are basically as same as those of the flowchart of FIG. 14. That is, the steps S710, S740, S750, S760, S780, S790, S800, S810 and S820 of the flowchart of FIG. 20 correspond to the steps S410, S420, S430, S470, S490, S500, S440, S450 and S460 of the flowchart of FIG. 14, respectively.

Accordingly, at the step S720 following to the affirmative decision at the step S710, the control unit 41 reads the integral Sg of the output of the acceleration sensor 37.

At the step S730, the control unit 41 calculates a feedback correction quantity Qfpltfb on the basis of the obtained integral Sg.

Thereafter, at the step 770 following the step S760 after the negative decision at the step S750, the control unit 41 calculates the pilot fuel injection quantity Qfplt by adding the feedback correction quantity Qfpltfb to the basic pilot fuel injection quantity Qfpltb (Qfplt←Afpltb+Qfpltfb).

Figure 21:
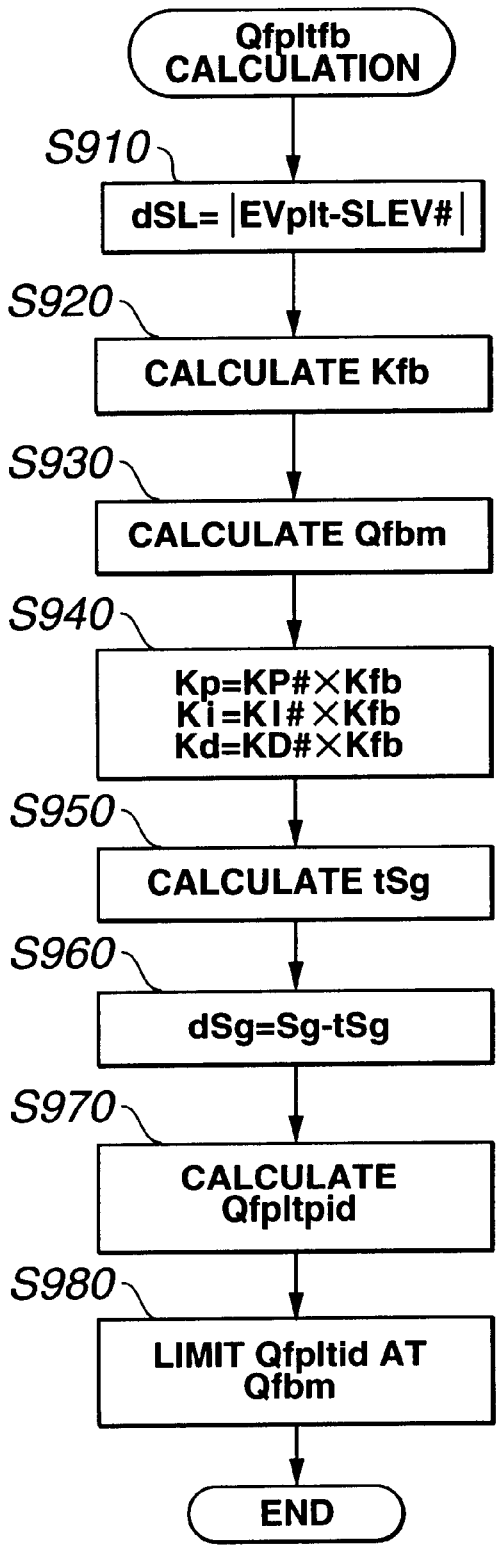
FIG. 21 is a flowchart of a programmed routine for calculating a feedback correction quantity Qfpltfb of the pilot fuel injection quantity of the second embodiment.

With reference to a flowchart of FIG. 21, the manner of the calculation of the feedback correction quantity Qfpltfb will be discussed hereinafter.

At a step S910, the control unit 41 calculates an absolute value dSL of a difference between the decision value EVplt and the slice level SLEV# (dSL=|EVplt−SLEV#|.

At a step S920, the control unit calculates a correction coefficient Kfb of a feedback constant by retrieving mapped data corresponding to a graph shown in FIG. 33 from the absolute value dSL calculated at the step S910.

Figure 23:
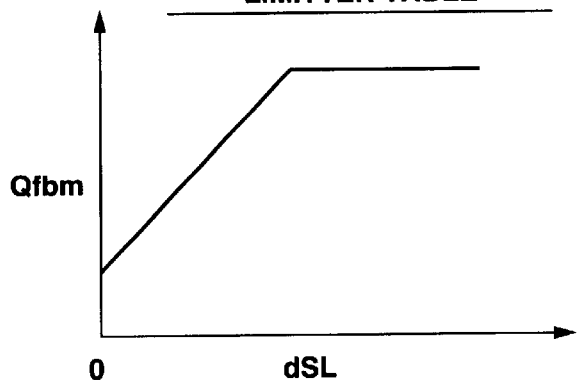
FIG. 23 is a graph showing a mapped table as to a correction allow limiter.

At a step S930, the control unit 41 calculates a correction allowable limit Qfbm by retrieving mapped data corresponding to a graph shown in FIG. 23 from the absolute value dSL.

At a step S940, the control unit 41 calculates a proportional constant Kp, an integral constant Ki, and a derivative coefficient Kd of feedback coefficients employed in the PID (proportional plus integral plus derivative) control by using the correction coefficient (correction gain) Kfb of the feedback constant (Kp=KP#×Kfb, Ki=KI#×Kfb, Kd=KD#×

Figure 22:
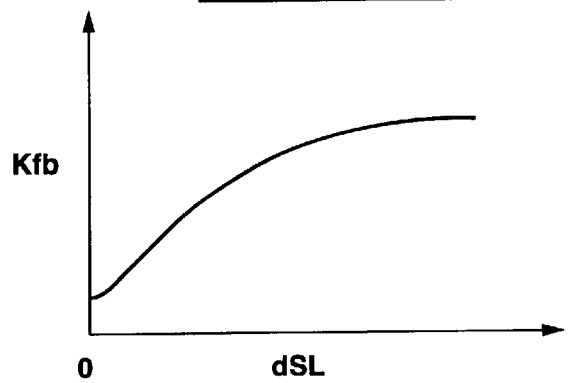
FIG. 22 is a graph showing a mapped table as to a correction coefficient

Kfb). Herein, when the absolute value dSL is small, that is, when the decision value EVplt is near the slice level SLEV#, the reliability to the pilot fuel injection is low, and the degree of the demand for executing the pilot fuel injection is small. Therefore, the correction coefficient Kfb is set so as to decrease according to the decrease of the absolute value dSL as shown in FIG. 22. Further, in a region where the absolute value dSL is large, since the feedback correction quantity should be suppressed at a minimum of the necessary value, the correction allow limiter Qfbm is limited by a predetermined value when the absolute value becomes greater than a predetermined value as shown in FIG. 23.

Figure 24:
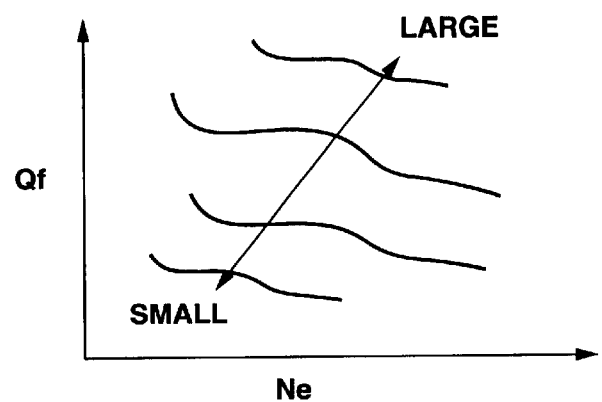
FIG. 24 is a graph showing a mapped table as to a target vibration level.

At a step S950, the control unit 41 calculates a target vibration level tSg by retrieving mapped data corresponding to the graph shown in FIG. 24 from the engine rotation speed Ne and the target fuel injection quantity Qf.

At a step S960, the control unit 41 calculates a difference dSg between the actual vibration level Sg and the target vibration level tSg (dSg=Sg−tSg).

At a step S970, the control unit 41 calculates a PID correction quantity Qfpltpid from the difference dSg, and the feedback coefficients Kp, Ki, and Kd.

At a step S980, the control unit 41 limits the PID correction coefficient Qfpltpid so as to limit the absolute value of the PID correction coefficient Qfpltpid within the allow limiter Qfbm (−Qfbm≦Qfpltpid≦Qfbm). Then, the control unit 41 sets the limited PID correction coefficient Qfpltpid at the feedback correction quantity Qfpltfb of the pilot fuel injection.

With the thus arranged second embodiment, since the feedback correction quantity for the pilot fuel injection quantity is employed, it becomes possible to eliminate dispersion of the flow rate characteristic of and aging deterioration of the fuel injector in the pilot fuel injection region except for the mono-cylinder control zone.

Figure 26:
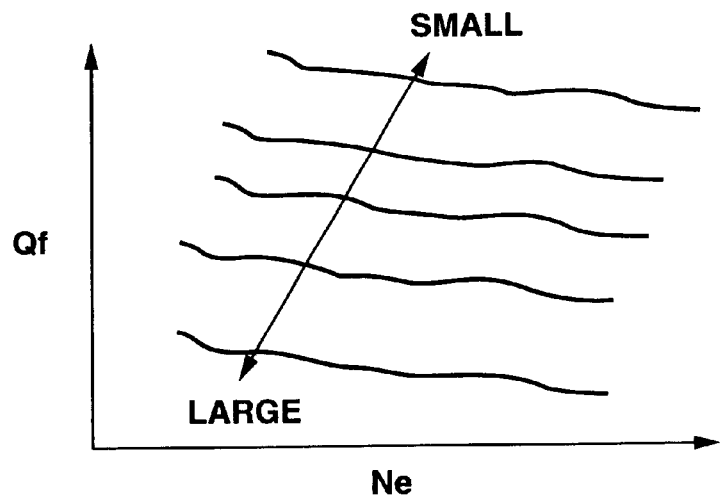
FIG. 26 is a map of a learning value of the pilot fuel injection ratio.

Referring to FIGS. 25 to 29, a third embodiment of the fuel injection control system according to the present invention will be discussed. The basic construction of the third embodiment is as same as that of the first embodiment shown in FIG. 1 and therefore the explanation of the employed elements are omitted herein. The third embodiment is specifically programmed such that the pilot fuel injection ratio employed in the mono-cylinder control is treated as a first learning value in the mono-cylinder control zone and that the pilot fuel injection quantity is treated as a second learning value in the pilot injection zone except for the mono-cylinder control zone. More specifically, the second embodiment has two characteristic points as follows:

First, when the engine operating condition is in the mono-cylinder control zone, the control unit 41 obtains the first learning value Lrplt of the pilot injection ratio by retrieving first learning value mapped data corresponding to a graph shown in FIG. 26 from the engine rotation speed Ne and the target fuel injection quantity Qf. Further, the control unit 41 calculates the pilot fuel injection quantity Qfpltn for each cylinder from the following equation (3):

$$Qfpltn = Lrplt \times (Qf + QADCn) \quad (3)$$

Figure 25:
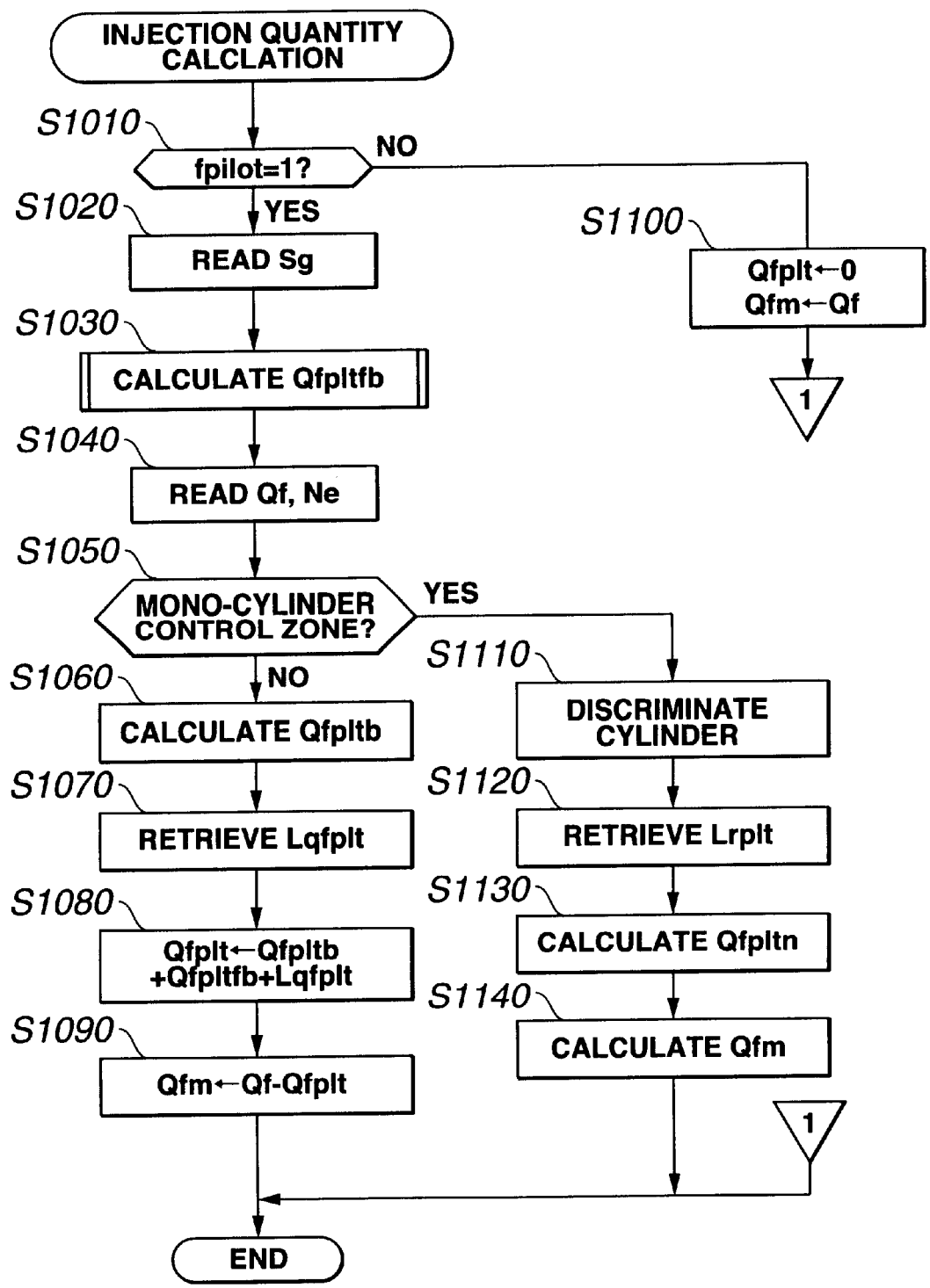
FIG. 25 is a flowchart of a programmed routine for calculating the fuel injection quantity employed in a third embodiment.

These operations of retrieval and calculation are achieved by executing steps S1070 and S1080 in the flowchart of FIG. 25.

Figure 27:
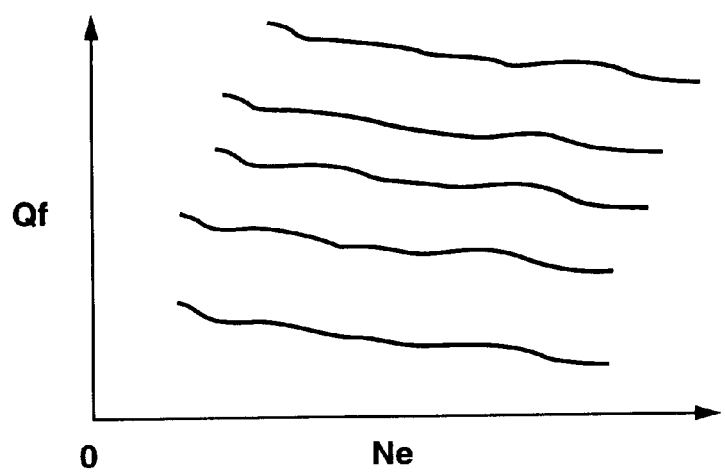
FIG. 27 is a map of a learning value of the pilot fuel injection quantity.

Second, when the engine operating condition is out of the mono-cylinder control zone, the control unit 41 obtains the second learning value of the pilot fuel injection quantity by retrieving second learning value mapped data corresponding to a graph shown in FIG. 27 from the engine rotation speed Ne and the target fuel injection quantity Qf. Further, the control unit 41 obtains the pilot fuel injection quantity Qfplt by correcting the basic pilot fuel injection quantity Qfpltb by means of the second learning value Lqfplt and the feedback correction quantity Qfpltfb (Qfplt←Qfpltb+Qfpltfb+Lqfplt). These operations of the retrieval and the calculation are achieved by executing steps S1120 and S1130 in the flowchart of FIG. 25.

More specifically, the programmed routine shown by the flowchart of FIG. 25 is generally similar to that shown by the flowchart of FIG. 20 employed in the second embodiment, except that the retrieval steps S1070 and S1120 are newly added and the calculation steps S1080 and S1130 are provided instead of the steps S770 and S810, respectively. Steps S1010–S1060, S1090–S1110 and S1140 shown in the flowchart of FIG. 25 are the same as the steps S710–S760, S780–S800, and S820 shown in the flowchart of FIG. 20, respectively. The operation of the new steps S1120, S1130, S1070 and S1080 will be specifically discussed hereinafter.

At the step S1120 following to the affirmative decision of the mono-cylinder control at the step S1050 and the execution of the step S1110, the control unit 41 obtains the first learning value Lqfplt by retrieving mapped data corresponding to the graph shown in FIG. 26 from the engine rotation speed Ne and the target fuel injection quantity Qf.

At the step S1130, the control unit 41 calculates the pilot fuel injection quantity Qfpltn for each cylinder from the above-mentioned equation (4), as discussed in the first characteristic point.

On the other hand, at the step S1070 following to the negative decision of the mono-cylinder control at the step S1050 and the execution of the step S1060, the control unit 41 obtains the second learning value Lqfplt by retrieving mapped data corresponding to the graph shown in FIG. 27 and the engine rotation speed Ne and the target fuel injection quantity Qf.

At the step S1080, the control unit 42 calculates the pilot fuel injection quantity Qfplt by correcting the basic pilot fuel injection quantity Qfpltb by means of the second learning value Lqfplt and the feedback correction quantity Qfpltfb (Qfplt←Qfpltb+Qfpltfb+Lqfplt).

In order to prevent the learning value from disappearing, the mapped data corresponding to the maps shown in FIGS. 26 and 27 is stored in the EEPROM of the control unit 41. Further, the initial value of the learning value is previously set at a matching value or 0.

Figure 28:
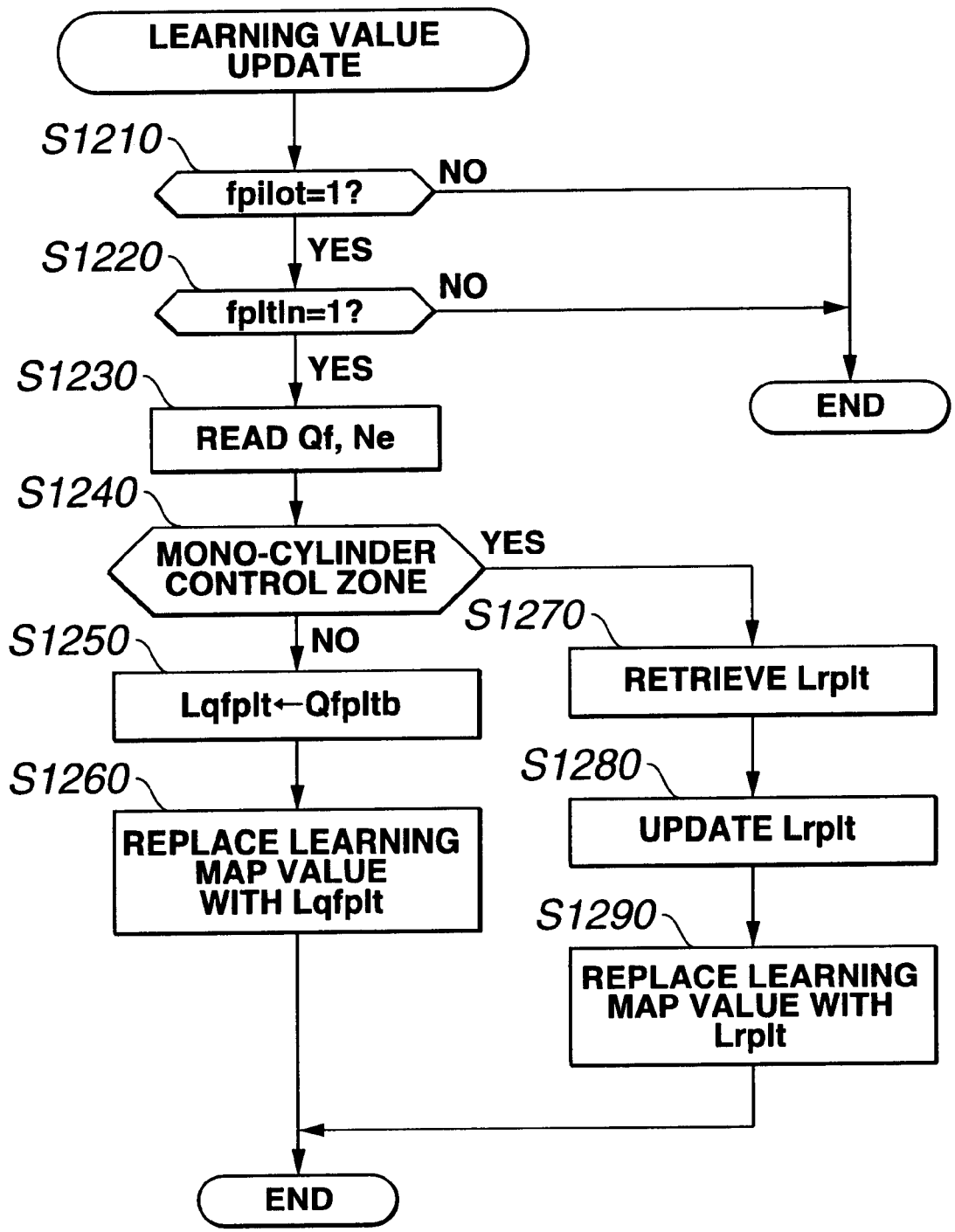
FIG. 28 is a flowchart of a programmed routine for updating the learning values.

The first and second learning values Lrplt and Lqfplt are updated by executing the programmed routine shown by a flowchart of FIG. 28. This routine is independently executed by each input of the Ref signal as follows:

At a step 1210, the control unit 41 decides whether the P.I.E.D. flag fpilot is set at 1 or not. When the decision at the step S1210 is affirmative (fpilot=1), the routine proceeds to a step S1220. When the decision at the step S1210 is negative (fpilot=0), the routine proceeds to an end block to terminate the present routine.

At the step S1220, the control unit 41 decides whether a learning allow flag fpltln is set at 1 or not. When the decision at the step S1220 is affirmative (fpltln=1), the routine proceeds to a step S1230. When the decision at the step S1220 is negative (fpltln=0), the routine proceeds to the end block to terminate the present routine.

At the step S1230, the control unit 41 reads the engine rotation speed Ne and the target fuel injection quantity Qf.

At a step S1240, the control unit 41 decides whether or not the engine operating condition is in the mono-cylinder control zone on the basis of the engine rotation speed Ne and the target fuel injection quantity Qf and the mapped data corresponding to FIG. 17. When the decision at the step S1240 is affirmative, the routine proceeds to a step S1250 to execute the absolute value learning. When the decision at the step S1240 is negative, the routine proceeds to a step S1270 to execute the ratio learning.

At the step S1250 following to the affirmative decision at the step S1240, the control unit 41 sets the present pilot fuel injection learning value Lqfplt at the feedback correction value Qfpltfb of the pilot fuel injection quantity (Lqfplt←Qfpltfb).

At a step S1260, the control unit 41 replaces the mapped data selected by the engine rotation speed Ne and the target fuel injection quantity Qf with the learning value Lqfplt set at the steep S1250 and stores the updated mapped data in a storage section. If this update of the learning value of the pilot fuel injection quantity was executed under each engine operating condition as to the mapped data corresponding to the map of FIG. 27, the feedback correction quantity Qfpltfb should take zero. Therefore, the learning value Lqfplt of the pilot fuel injection quantity functions to determine the pilot fuel injection quantity optimally even before the feedback control of the pilot fuel injection quantity is newly executed in a zone out of the pilot fuel injection zone after the engine 1 is started.

On the other hand, regarding the ratio learning, at the step S1270 following to the negative decision at the step S1240, the control unit 41 selects the learning value Lrplt of the pilot fuel injection ratio by retrieving mapped data corresponding to the map of FIG. 26 from the engine rotation speed Ne and the target fuel injection quantity Qf.

At a step S1280, the control unit 41 treats the retrieved learning value Lrplt as a pre-updated value and updates the retrieved learning value Lrplt with a value obtained from the following equation (4):

$$Lrplt = (Lrplt_{-1} \times Qf + Qfpltfb)/Qf, \quad (4)$$

where Lrplt is the learning value after the present update, and $Lrplt_{-1}$ is the learning value before the present update.

At a step S1290, the control unit 41 replaces the pre-updated learning value $Lrplt_{-1}$ with the updated learning value Lrplt and stores it as the updated mapped data of the learning-value in the storage section.

When the feedback correction quantity Qfpltfb takes a positive large value and when the engine operating condition is varied from a zone in the pilot fuel injection zone and out of the mono-cylinder control zone to a zone in the pilot fuel injection zone and in the mono-cylinder control zone, the learning value update is not preferable. That is, when the learning value Lrplt of the pilot fuel injection ratio is updated by the equation (4) and the feedback correction value Qfpltfb taking a large value, the learning value is largely updated to take a large value. In order to avoid this radical change, the initial value of the integral component Ki of the PID correction quantities is set as the previous value of the learning value Lrplt at the above-mentioned switching point of the engine operating condition at which the engine operating condition is varied from the zone in the pilot fuel injection zone and out of the mono-cylinder control zone to the zone in the pilot fuel injection zone and in the mono-cylinder control zone.

Figure 29:
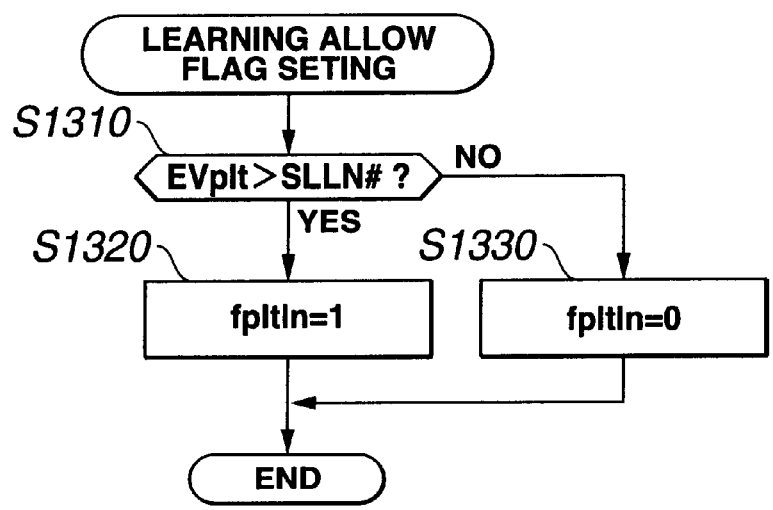
FIG. 29 is a flowchart of a programmed routine for setting a leaning value allow flag.

Next, the manner of setting the learning allow flag fplotn will be discussed hereinafter with reference to a flowchart of FIG. 29.

Figure 13:
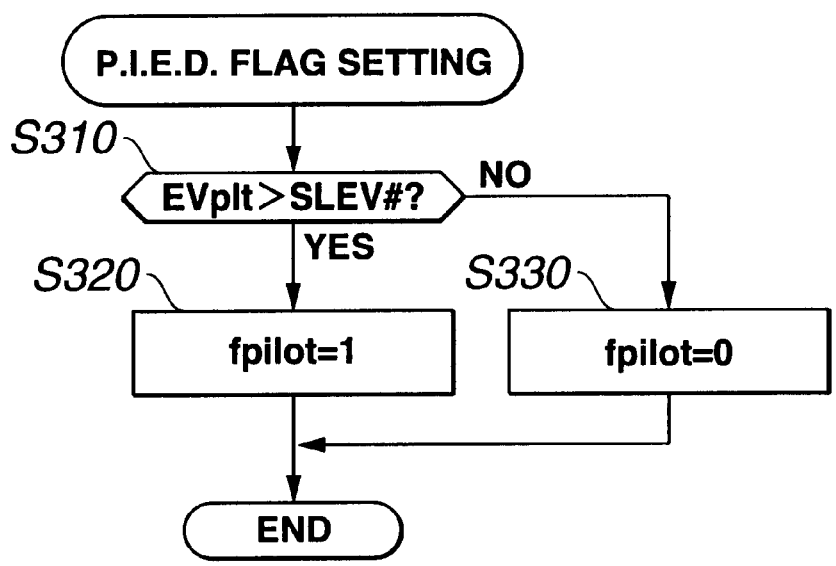
FIG. 13 is a flowchart of a programmed routine for setting a decision flag for deciding an execution of the pilot fuel injection.

At a step S1310, the control unit 41 decides whether the decision value EVplt is greater than a slice level SLLN# which takes a value greater than the slice level SLEV# employed in FIG. 13. When the decision at the step S1310 is affirmative (EVplt>SLLN#), the routine proceeds to a step S1320 wherein the control unit 41 sets the learning allow flag fpltln at 1 (fpltln=1) to allow the learning to be executed. When the decision at the step S1310 is negative (EVplt≦SLLN#), the routine proceeds to a step S1330 wherein the control unit 41 resets the learning allow flag fpltln (fpltln=0) to forbid the learning to be executed. The slice level SLLN# is set to take a value larger than the slice level SLEV# employed in FIG. 13. Therefore, even if the decision value EVplt is greater than the slice level SLEV# and if smaller than the slice level SLLN#, the learning is prohibited. That is, the learning allow flag setting is aimed to obtain a high reliability of the learning process and the learning value obtained thereby by requiring a further higher value to the decision value EVplt which requirement also indicates that the degree of the demand for executing the pilot fuel injection is high.

With the thus arranged third embodiment, it becomes possible to optimally determine the pilot fuel injection quantity by means of the learning value Lqfplt of the pilot fuel injection quantity even before the feedback control of the pilot fuel injection quantity is newly executed in the pilot fuel injection zone but out of the low-load zone after the engine 1 is started when the learning as to the absolute value of the pilot injection quantity has been promoted.

Further, the promotion of the ratio learning as to the pilot fuel injection quantity similarly enables the pilot fuel injection to be optimally determined by the learning value Lqfplt of the pilot fuel injection quantity before the feedback control of the pilot fuel injection quantity is newly executed in the low-load zone after-the engine 1 is started.

Figure 31:
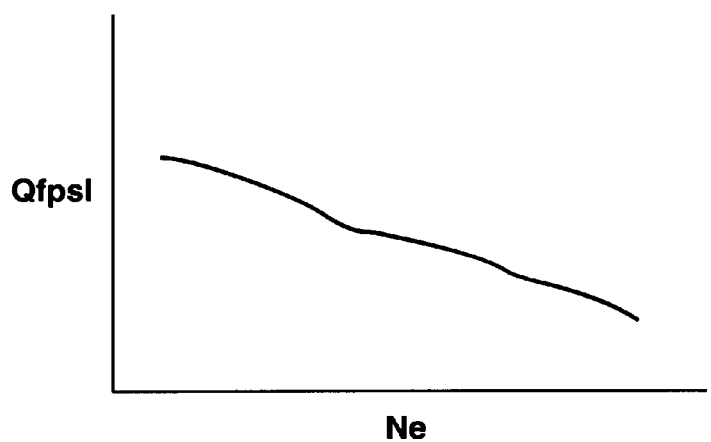
FIG. 31 is a graph showing a slice level table employed in the fourth embodiment.
Figure 30:
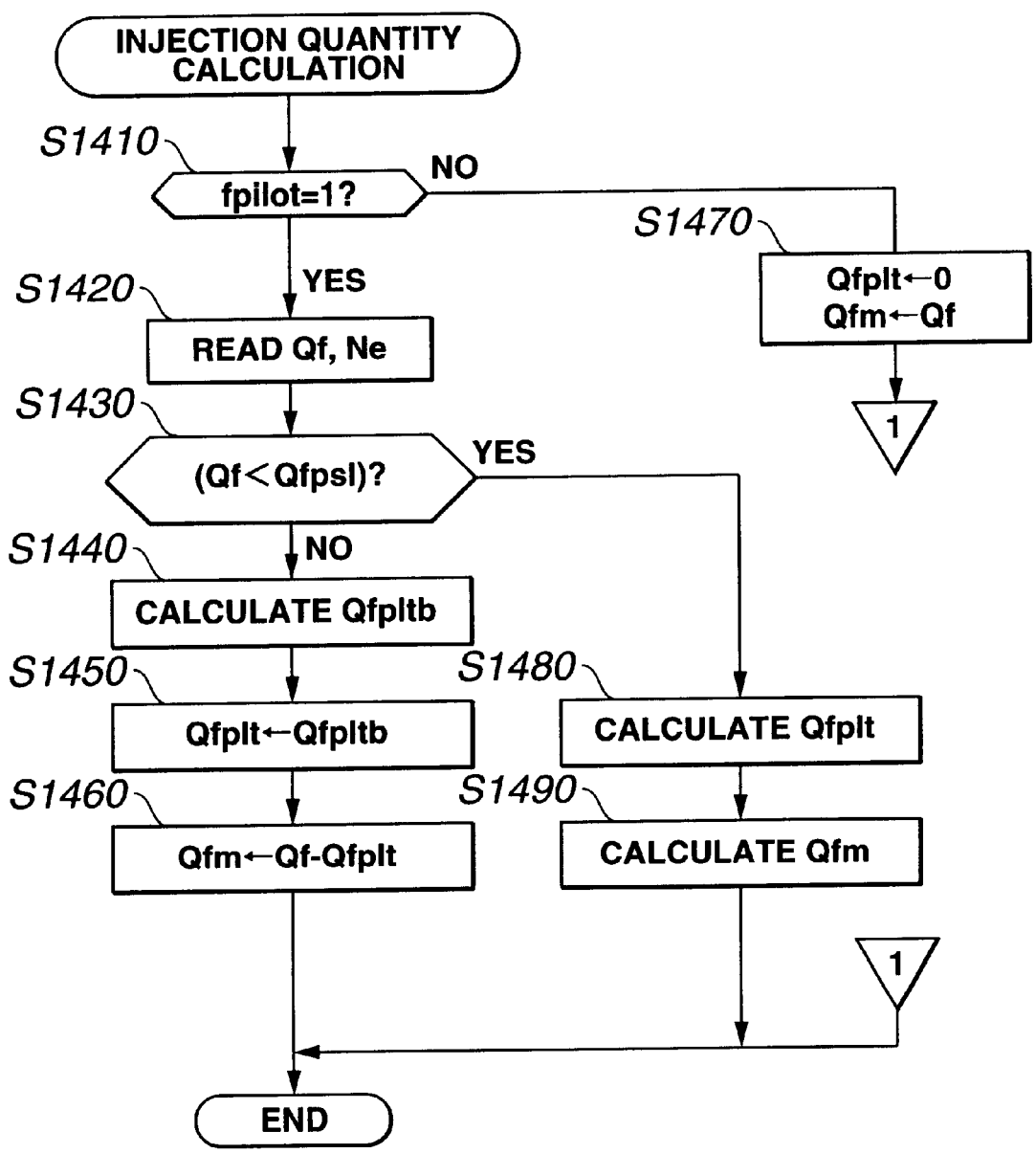
FIG. 30 is a flowchart of a programmed routine for calculating the fuel injection quantity employed in a fourth embodiment.

Referring to FIGS. 30 and 31, a fourth embodiment of the fuel injection control system according to the present invention will be discussed hereinafter. The basic construction of the fourth embodiment is basically as same as that of the first embodiment shown in FIG. 1 except that the fuel injection control system of the fourth embodiment does not execute the mono-cylinder control, and therefore the explanation of the basic construction of the fourth embodiment will be omitted herein.

The fourth embodiment is characteristically arranged to apply the setting of the pilot fuel injection quantity to a diesel engine which does not execute the mono-cylinder control. The fuel injection quantity setting of the fourth embodiment will be discussed with reference to a flowchart of FIG. 30. The flowchart of FIG. 30 is generally similar to the flowchart of FIG. 14 of the first embodiment except that the steps S430 to S460 are replaced with steps S1430, S1480 and S1490. Step S1410, S1420, S1440, S1450, S1460 and S1470 of FIG. are as same as the steps S410, S420, S470, S480, S490 and S500 of FIG. 14 of the first embodiment, respectively. Therefore, the explanation of these steps of the fourth embodiment will be omitted herein. Only the steps S1430, S1480 and S1490 will be discussed hereinafter.

At the step S1430 following to the execution of the step S1420, the control unit 41 decides whether or not the engine operating condition is in a low-load operation zone by comparing the target fuel injection quantity Qf with a slice level Qfpsl. When the decision at the step S1430 is affirmative (Qf<Qfpsl), the routine proceeds to the step S1480. When the decision at the step S1430 is negative (Qf<Qfpsl), the routine proceeds to the step S1440.

At the step S1480, the control unit 41 calculates the pilot fuel injection quantity Qfplt by multiplying the pilot fuel injection ratio Rplt of FIG. 15 with the target fuel injection quantity Qf (Qfplt←Qf×Rplt).

At the step S1490, the control unit 41 calculates the main fuel injection quantity Qfm by subtracting the pilot fuel injection quantity Qfplt form the target fuel injection quantity Qf (Qfm←Qf×Qfplt). Thereafter, the routine proceeds to an end block to terminate the present routine.

With this arrangement of the fourth embodiment according-to the present invention, it becomes possible to firmly ensure the pilot fuel injection quantity under the low-load operation of an engine which does not execute the mono-cylinder control.

Although the embodiments according to the present invention have been shown and described to employ the integral of the output of the acceleration sensor 37, it will be understood that a result of analyzing the frequency of the output of the acceleration sensor 37 by means of FFT (fast Fourier transform) may be employed instead of the integral of the output of the acceleration sensor 37.

Further, although the embodiments according to the-present invention have been shown and described such that the evaluation functions shown in FIGS. 4 to 12 are applied for an engine which is arranged to execute the low-temperature pre-mixing combustion, it will be understood that the present invention is not limited to this type of the engine. For example, in case of an engine which executing a normal diesel combustion mainly including dispersing combustion, there is a demand for executing the pilot fuel injection for the normal diesel combustion. Therefore, in such a case, the evaluation functions may be set according to the demand of this pilot fuel injection as is similar to the setting of the evaluation functions of FIGS. 4 to 12.

The entire contents of Japanese Patent Application No. 11-205950 filed on Jul. 21, 1999 in Japan are incorporated herein by reference.

Although the invention has been described above by reference to certain embodiments of the invention, the invention is not limited to the embodiments described above. Modifications and variations of the embodiment described above will occur to those skilled in the art, in light of the above teaching. The scope of the invention is defined with reference to the following claims.

What is claimed is:

1. A method of controlling a fuel injection of a multi-cylinder diesel engine, said method comprising:

deciding whether a pilot fuel injection is executed;

deciding whether an operating condition of the engine is in a predetermined low-load operating region;

calculating a mono-cylinder fuel injection quantity for each cylinder of the engine when the engine operating condition is in the predetermined low-load operating region;

calculating a common fuel injection quantity common among the cylinders of the engine when the engine operating condition is out of the predetermined low-load operating region;

calculating a mono-cylinder pilot fuel injection quantity for each cylinder by multiplying a predetermined ratio to the fuel injection quantity when the engine operating condition is in the predetermined low-load operating region and when the pilot fuel injection is executed;

calculating a common pilot fuel injection quantity common among the cylinders when the engine operating condition is out of the predetermined low-load operating region and when the pilot fuel injection is executed; and calculating a main fuel injection quantity by one of a first method of subtracting the mono-cylinder pilot fuel injection quantity from the mono-cylinder fuel injection quantity and a second method of subtracting the common pilot fuel injection quantity from the common fuel injection quantity.

2. A fuel injection control system for a multi-cylinder diesel engine, comprising:

a control unit arranged to decide whether a pilot fuel injection is executed, to decide whether an operating condition of the engine is in a predetermined low-load operating region, to calculate a mono-cylinder fuel injection quantity for each cylinder of the engine when the engine operating condition is in the predetermined low-load operating region, to calculate a common fuel injection quantity common among the cylinders of the engine when the engine operating condition is out of the predetermined low-load operating region, to calculate a mono-cylinder pilot fuel injection quantity for each cylinder by multiplying a predetermined ratio to the fuel injection quantity when the engine operating condition is in the predetermined low-load operating region and when the pilot fuel injection is executed, to calculate a common pilot fuel injection quantity common among the cylinders when the engine operating condition is out of the predetermined low-load operating region and when the pilot fuel injection is executed, and to calculate a main fuel injection quantity by one of a first method of subtracting the mono-cylinder pilot fuel injection quantity from the mono-cylinder fuel injection quantity and a second method of subtracting the common pilot fuel injection quantity from the common fuel injection quantity.

3. The fuel injection control system as claimed in claim 2, wherein said control unit is arranged to calculate the fuel injection quantity for each cylinder by adding a basic fuel injection quantity commonly employed to the cylinders to a correction fuel injection quantity for each cylinder.

4. The fuel injection control system as claimed in claim 2, wherein said control unit is arranged to obtain the parameter indicative of the engine operating condition, to calculate a decision value indicative of degree of a demand for executing the pilot fuel injection on the basis of the parameter, and to decide that the pilot fuel injection is executed when the degree of the demand for executing the pilot fuel injection is greater than a first slice level.

5. The fuel injection control system as claimed in claim 4, wherein said control unit is arranged to obtain a plurality of parameters indicative of the engine operating condition, to calculate a basic value as to the decision value for each cylinder by using evaluation functions for the respective parameters, and to select a largest one of the plurality of basic values as the decision value.

6. The fuel injection control system as claimed in claim 4, wherein said control unit is arranged to obtain a vibration level of the engine, to calculate a feedback correction gain for a feedback control of the pilot fuel injection quantity on the basis of a difference between the decision value and the first slice level, to calculate a feedback correction quantity on the basis of the vibration level, a target vibration level and the feedback correction gain, and to correct the pilot fuel injection quantity by means of the feedback correction quantity when the pilot fuel injection is executed.

7. The fuel injection control system as claimed in claim 4, wherein the control unit is arranged to obtain a vibration level of the engine, to calculate a correction allow limiter for a feedback control of the pilot fuel injection quantity on the basis of a difference between the decision value and the first slice level, to calculate the feedback correction quantity on the basis of the vibration level and a target vibration level, to limit the feedback correction quantity within a range of the correction allow limiter, and to correct the pilot fuel injection quantity by means of the limited feedback correction quantity when the pilot fuel injection is executed.

8. The fuel injection control system as claimed in claim 4, wherein said control unit is arranged to obtain a vibration level of the engine, to calculate a feedback correction quantity of the pilot fuel injection quantity on the basis of the vibration level and a target vibration level, to calculate a learning correction value of the pilot fuel injection quantity on the basis of the feedback correction quantity when the decision value indicative of the degree of the demand for executing the pilot fuel injection is greater than a second slice level which is greater than the firs slice level, and to correct the pilot fuel injection quantity by means of the feedback correction quantity and the learning correction quantity when the pilot fuel injection is executed.

9. The fuel injection control system as claimed in claim 4, wherein said control unit is arranged to obtain two parameters indicative of the engine operating condition, to calculate a basic value of a decision value from one of the two parameter by using an evaluation function with respect to the one parameter, to calculate a correction value of the decision value from the other of the two parameters by using an evaluation function with respect to the other parameter, and to take a value obtained by correcting the basic value by means of the correcting value as the decision value.

10. The fuel injection control system as claimed in claim 9, wherein the parameter indicative of the engine operating condition includes an intake air pressure, the evaluation function, which represents a relationship between the degree of the demand for executing the pilot fuel injection and the intake air pressure, being set such that the degree of the demand is low when the intake air pressure is in a low intake air pressure region, that the degree of the demand is high when the intake air pressure is in an intermediate intake air pressure region, and that the degree of the demand is low when the intake air pressure is in a high intake air pressure region.

11. The fuel injection control system as claimed in claim 9, wherein the parameter indicative of the engine operating condition includes an intake air flow rate, the evaluation function, which represents a relationship between the degree of the demand for executing the pilot fuel injection and the intake air flow rate, being set such that the degree of the demand is low when the intake air flow rate is in a low intake air flow rate region, that the degree of the demand is high when the intake air flow rate is in an intermediate intake air flow rate region, and that the degree of the demand is low when the intake air flow rate is in a high intake flow rate region.

12. The fuel injection control system as claimed in claim 9, wherein the parameter indicative of the engine operating condition includes an excess air ratio, the evaluation function, which represents a relationship between the degree of the demand for executing the pilot fuel injection and the excess air ratio, being set so that the degree of the demand is high when the excess air ratio is in a large ratio region.

13. The fuel injection control system as claimed in claim 9, wherein the parameter indicative of the engine operating condition includes a fuel injection quantity, the evaluation function, which represents a relationship between the degree of the demand for executing the pilot fuel injection and the fuel injection quantity, being set so that the degree of the demand is high when the fuel injection quantity is in a small quantity region.

14. The fuel injection control system as claimed in claim 9, wherein the parameter indicative of the engine operating condition includes a pressure ratio of an actual fuel injection pressure with respect to a target fuel injection pressure, the evaluation function, which represents a relationship between the degree of the demand for executing the pilot fuel injection and the pressure ratio, being set so that the degree of the demand is high when the pressure ratio is higher than 1.

15. The fuel injection control system as claimed in claim 9, wherein the parameter indicative of the engine operating condition includes an integral of an output of an acceleration sensor, the evaluation function, which represents a relationship between the degree of the demand for executing the pilot fuel injection and the integral, being set so that the degree of the demand is high when the integral is in a high region.

16. The fuel injection control system as claimed in claim 9, wherein the parameter indicative of the engine operating condition includes a cooling-water temperature, the evaluation function, which represents a relationship between the degree of the demand for executing the pilot fuel injection and the cooling-water temperature, being set so that the degree of the demand increases according to lowering of the cooling water temperature.

17. The fuel injection control system as claimed in claim 9, wherein the parameter indicative of the engine operating condition includes an exhaust gas recirculation (EGR) ratio, the evaluation function, which represents a relationship between the degree of the demand for executing the pilot fuel injection and the EGR ratio, being set so that the degree of the demand increases according to decrease of the EGR ratio.

18. The fuel injection control system as claimed in claim 9, wherein the parameter indicative of the engine operating condition includes an intake air temperature, the evaluation function, which represents a relationship between the degree of the demand for executing the pilot fuel injection and the intake air temperature, being set so that the degree of the demand is high when the intake air temperature is in a low temperature region, that the degree of the demand is low when the intake air temperature is in an intermediate temperature region, and that the degree of the demand is high when the intake air temperature is in a high temperature region.

19. The fuel injection control system as claimed in claim 9, wherein the parameter indicative of the engine operating condition includes at least two of an intake air pressure, an excess air ratio, a fuel injection quantity, a ratio of an actual fuel injection pressure with respect to a target fuel injection pressure, an integral of an output of an acceleration sensor, a cooling-water temperature, an EGR ratio and an intake air temperature, said control unit having the evaluation functions, which represent relationships between the degree of the demand for executing the pilot fuel injection and the parameter, said control unit calculating the degree of the demand for executing the pilot fuel injection from each of the evaluation function and the parameter, said control unit taking a largest one of the calculated degrees of the demand as the decision value.

20. The fuel injection control system as claimed in claim 19, wherein the control unit has a plurality of evaluation functions which represent relationships between the degree of the demand for executing the pilot fuel injection and the parameter, said evaluation functions being divided into a basic value calculation function and a correction value calculation function, said control unit correcting a value obtained from the basic value calculating function by means of a value obtained from the correction calculation function.

* * * * *